United States Patent
Masuda

(10) Patent No.: US 8,730,839 B2
(45) Date of Patent: May 20, 2014

(54) CONTROL DEVICE, COMMUNICATION TERMINAL, CONTROL METHOD, COMMUNICATION CONTROL METHOD, AND INTEGRATED CIRCUIT

(75) Inventor: Yoichi Masuda, Osaka (JP)

(73) Assignee: Panasonic Corporation, Osaka (JP)

( * ) Notice: Subject to any disclaimer, the term of this patent is extended or adjusted under 35 U.S.C. 154(b) by 270 days.

(21) Appl. No.: 13/322,284

(22) PCT Filed: Apr. 6, 2011

(86) PCT No.: PCT/JP2011/002053
§ 371 (c)(1),
(2), (4) Date: Nov. 23, 2011

(87) PCT Pub. No.: WO2011/129071
PCT Pub. Date: Oct. 20, 2011

(65) Prior Publication Data
US 2012/0076050 A1 Mar. 29, 2012

(30) Foreign Application Priority Data

Apr. 12, 2010 (JP) ................................. 2010-091545

(51) Int. Cl.
| H04L 12/28 | (2006.01) |
| H04B 3/54 | (2006.01) |
| H04L 12/403 | (2006.01) |
| H04L 12/413 | (2006.01) |

(52) U.S. Cl.
CPC .................. *H04B 3/54* (2013.01); *H04B 3/544* (2013.01); *H04L 12/403* (2013.01); *H04L 12/413* (2013.01)
USPC .......................................... 370/254; 370/400

(58) Field of Classification Search
CPC .. H04B 3/54; H04B 3/544; H04B 2203/5458; H04B 2203/5408; H04L 12/413; H04L 12/403
See application file for complete search history.

(56) References Cited

U.S. PATENT DOCUMENTS

| 4,759,011 A * | 7/1988 | Hicks, Jr. .......................... 398/60 |
| 7,463,877 B2 * | 12/2008 | Iwamura ........................ 455/402 |
| 2003/0193576 A1 | 10/2003 | Fujii |

FOREIGN PATENT DOCUMENTS

| JP | 2001-308756 | 11/2001 |
| JP | 2002-111555 | 4/2002 |
| JP | 2002-300093 | 10/2002 |
| JP | 2004-7479 | 1/2004 |
| JP | 2004-7497 | 1/2004 |
| JP | 2009-4928 | 1/2009 |
| JP | 2009-100138 | 5/2009 |

OTHER PUBLICATIONS

International Search Report issued May 17, 2011 in International (PCT) Application No. PCT/JP2011/002053.
Chinese Office Action along with partial English translation issued Jan. 24, 2014 in Application No. CN 201180002328.1.

* cited by examiner

*Primary Examiner* — Min Jung
(74) *Attorney, Agent, or Firm* — Wenderoth, Lind & Ponack, L.L.P.

(57) ABSTRACT

In a power line communication system, a control device sets an intra-breaker communication period during which communication is performed between communication terminals connected to a single breaker, and an inter-breaker communication priority period during which communication is performed between communication terminals connected to different breakers from each other. The control device operates filters so that the filters allow signals that travel via breakers to pass through the filters during the inter-breaker communication priority period, and so that the filters block signals that travel via breakers from passing through the filters during the intra-breaker communication period.

16 Claims, 11 Drawing Sheets

FIG.5A

| Physical address | | Logical address | |
|---|---|---|---|
| Destination | Transmission source | Destination | Transmission source | Breaker ID | Upper layer data |

FIG.5B

| Physical address | | Logical address | | | |
|---|---|---|---|---|---|
| Terminal B1 | Terminal A1 | Terminal B1 | Terminal A1 | Breaker A | Upper layer data |

FIG.5C

| Physical address | | Logical address | | | |
|---|---|---|---|---|---|
| Distribution board | Terminal A1 | Terminal B1 | Terminal A1 | Breaker A | Upper layer data |

FIG.5D

| Physical address | | Logical address | | | |
|---|---|---|---|---|---|
| Terminal B1 | Distribution board | Terminal B1 | Terminal A1 | Breaker A | Upper layer data |

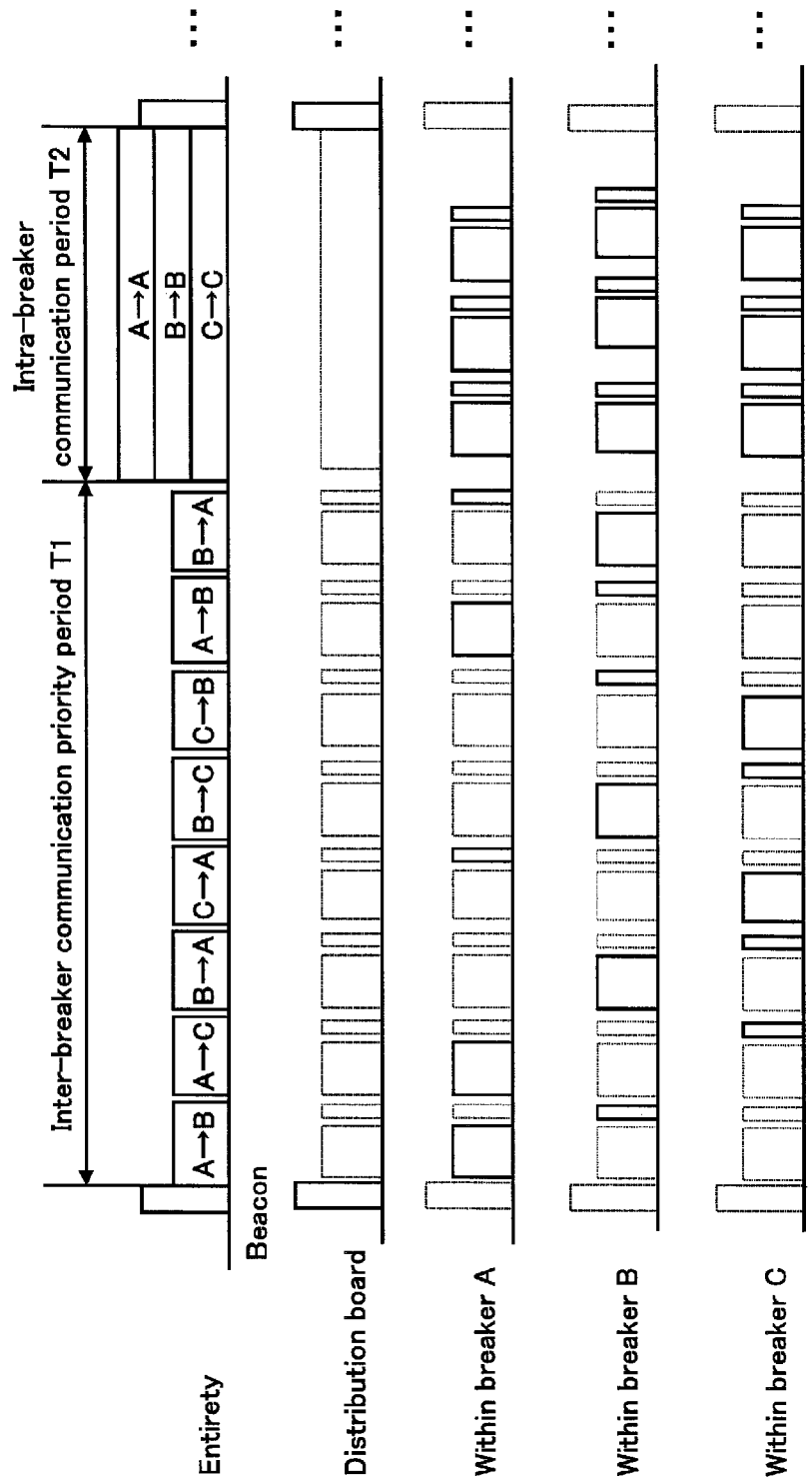

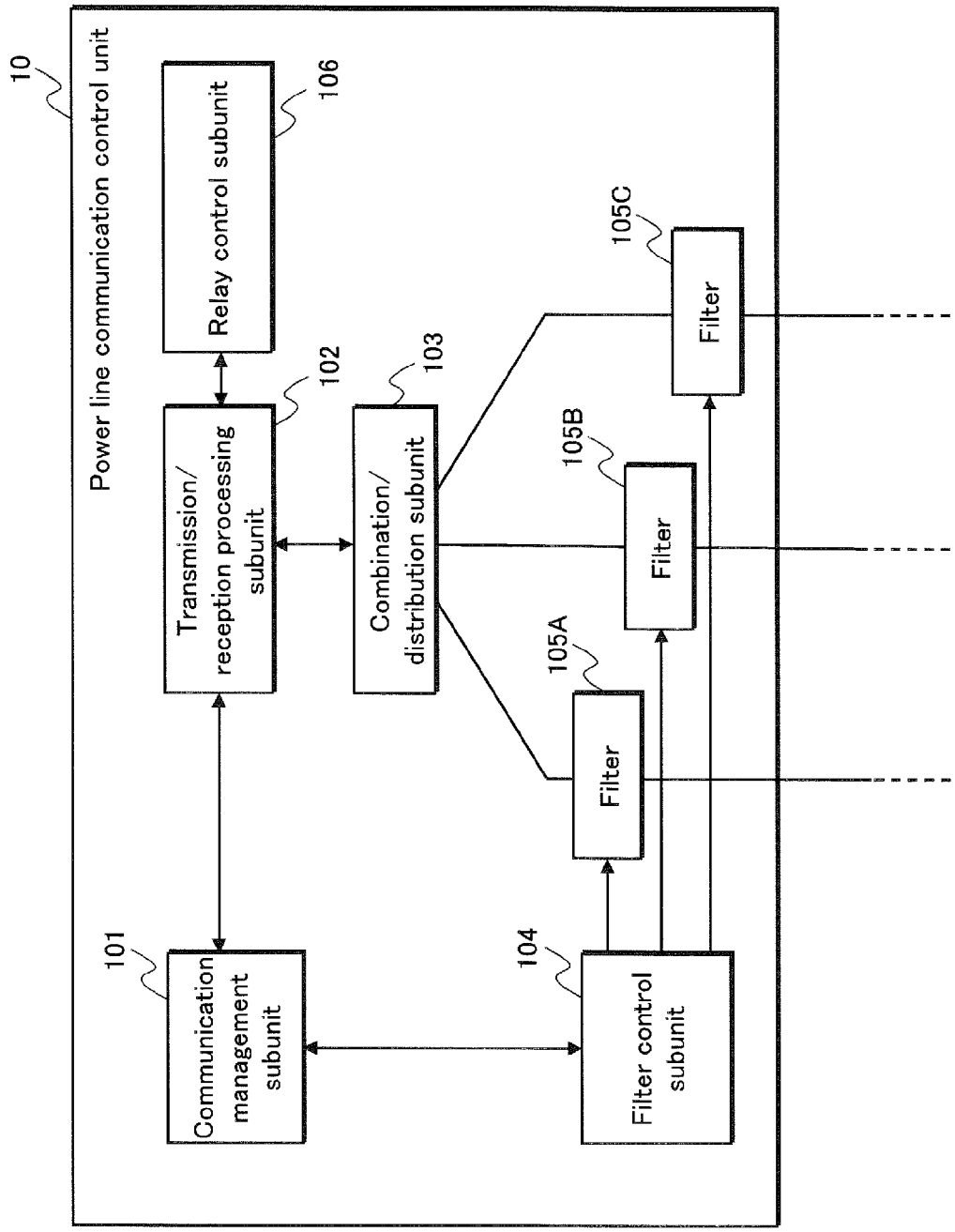

CONTROL DEVICE, COMMUNICATION TERMINAL, CONTROL METHOD, COMMUNICATION CONTROL METHOD, AND INTEGRATED CIRCUIT

CROSS-REFERENCE TO RELATED APPLICATIONS

This application is based on a Japanese patent application No. 2010-091545 filed on Apr. 12, 2010 in Japan. The entire disclosure of the claims, the specification, the drawings and the abstract of the aforementioned Japanese patent application is hereby incorporated by reference.

TECHNICAL FIELD

The present invention relates to communication technology using wired lines such as power lines.

BACKGROUND ART

In one type of conventional power line communication systems, communication terminals that perform communication with one another by superimposing signals onto the power lines are distributed throughout a building. Examples of such communication terminals include various types of home electronic appliances in the case of general households, or lighting fixtures and personal computers in the case of office buildings. The communication terminals are connected to the power lines and act as load devices in the power line communication system.

These load devices often have an extremely low impedance compared to the characteristic impedance of the power lines in the signal frequency band used for the power line communication. As the number of load devices connected to the power lines increases, signal attenuation in the power line communication system is increased due to the impedances corresponding to the number of such load devices. This is one cause of an increase in the communication error rate. Furthermore, some load devices generate high-level noise, which is another cause of an increase in the communication error rate.

Several methods have been proposed to alleviate an increase in the communication error rate. Examples of such methods include attaching impedance boosters to problematic load devices, and relaying communication between terminals by using a relay device. One example of such methods is to place a dedicated relay device inside or in the vicinity of a distribution board, which is disclosed in Patent Literature 1.

CITATION LIST

Patent Literature

[Patent Literature 1]
JP Patent Application Publication No. 2001-308756

SUMMARY OF INVENTION

Technical Problems

However, the structure disclosed in Patent Literature 1 gives rise to the problem that because the relay device retransmits the same data to perform a signal relay, the communication efficiency of the entire communication system is lowered. Furthermore, with the structure disclosed in Patent Literature 1, when communication is performed between communication terminals belonging to one breaker system, signals exchanged between these communication terminals are interfered with by signals exchanged between communication terminals belonging to another breaker system via a distribution board. This leads to deterioration of communication quality. If each communication terminal is allowed to perform communication at a preset timing in order to avoid the above interference, the frequency of communication performed by each communication terminal decreases. This gives rise to the problem that the communication efficiency of the entire communication system is lowered.

The present invention has been conceived in view of the above problems, and aims to provide a control device, a communication terminal, a control method and a communication method that can prevent a decrease in the communication efficiency during the power line communication.

Solution to Problems

In order to solve the above problems, one aspect of the present invention is a control device included in a communication system in which a plurality of networks are connected to one another by one or more wired channels, the control device comprising: a communication management unit configured to determine, for each network, (i) an inter-network communication period during which a communication terminal belonging to the network is allowed to perform communication with another communication terminal belonging to another network, and (ii) an intra-network communication period during which a communication terminal belonging to the network is allowed to perform communication only with another communication terminal belonging to the network; and a control unit configured to place, among one or more filters provided between the networks, (i) any filter provided between at least two of the networks in a passable state during the inter-network communication period, and (ii) every filter in a blocked state during the intra-network communication period.

Advantageous Effects of Invention

With the above structure, the networks are separated from one another by the filters during the intra-network communication period. As a result, signals exchanged through intra-network communication within one network do not leak into other networks. Therefore, during the intra-network communication period, it is possible to simultaneously perform (i) communication between communication terminals belonging to the same first network and (ii) communication between communication terminals belonging to the same second network. This can improve the communication efficiency of each communication terminal.

BRIEF DESCRIPTION OF DRAWINGS

FIG. 5A shows a concept of an example structure of a communication packet pertaining to Embodiments 1 and 2.

FIG. 5B shows a concept of an example structure of a communication packet that is directly transmitted from a terminal A1 to a terminal B1. FIG. 5C shows a concept of an example structure of a communication packet that is transmitted from the terminal A1 to the terminal B1 via a distribution board, the communication packet being in a state where it has been transmitted from the terminal A1 but is yet to arrive at the distribution board. FIG. 5D shows a concept of an example structure of a communication packet that is transmitted from the terminal A1 to the terminal B1 via the distribution board, the communication packet being in a state where it has been transmitted from the distribution board to the terminal B1.

FIG. 6 is a timing chart showing an example of communication performed in a beacon interval pertaining to Embodiment 1.

FIG. 7 is a block diagram showing the structure of a power line communication control unit 10 pertaining to Embodiment 2.

DESCRIPTION OF EMBODIMENTS

Figure 1:
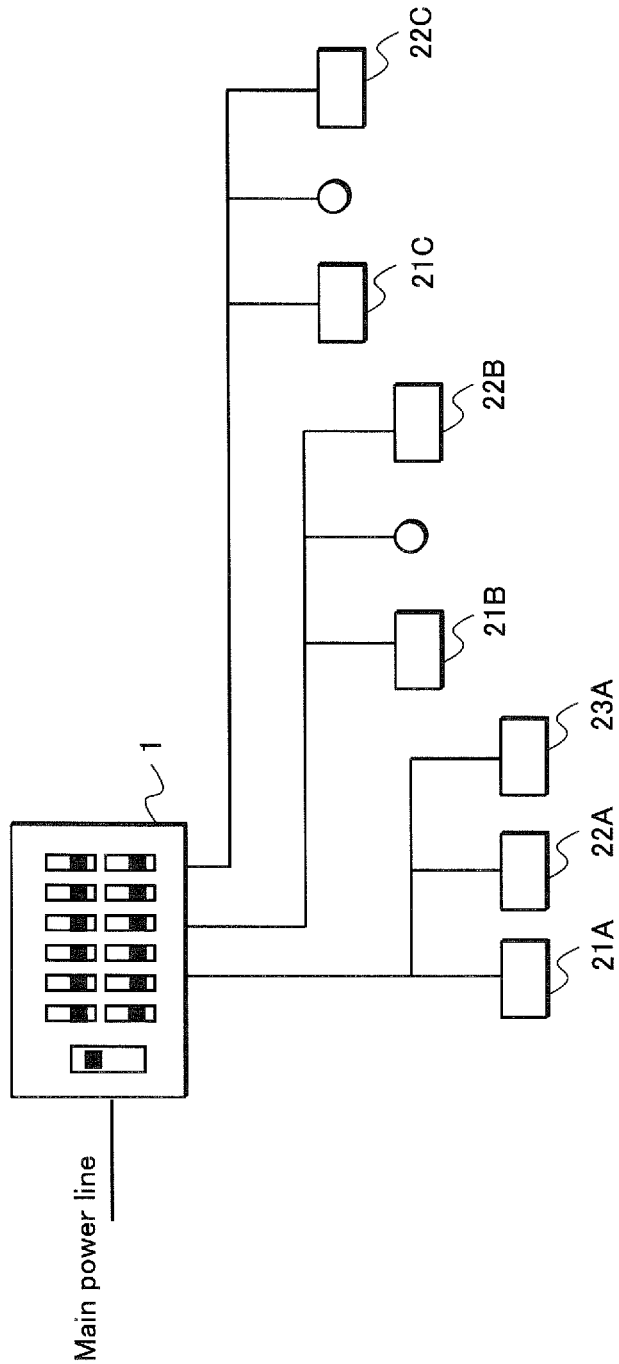
FIG. 1 shows a concept of the system structure of a power line communication system pertaining to an embodiment.

One aspect of the present invention is a first control device included in a communication system in which a plurality of networks are connected to one another by one or more wired channels, the first control device comprising: a communication management unit configured to determine, for each network, (i) an inter-network communication period during which a communication terminal belonging to the network is allowed to perform communication with another communication terminal belonging to another network, and (ii) an intra-network communication period during which a communication terminal belonging to the network is allowed to perform communication only with another communication terminal belonging to the network; and a control unit configured to place, among one or more filters provided between the networks, (i) any filter provided between at least two of the networks in a passable state during the inter-network communication period, and (ii) every filter in a blocked state during the intra-network communication period.

The above structure divides a communication period into an inter-network communication period and an intra-network communication period. Accordingly, each communication terminal can perform (i) communication with a communication terminal belonging to another network during the inter-network communication period, and (ii) communication with another communication terminal belonging to the same network during the intra-network communication period. Especially, during the intra-network communication period where the networks are separated from one another by the filters, it is possible to simultaneously perform intra-network communication within the first network and intra-network communication within the second network, which could not be performed with conventional techniques due to occurrence of multiple communication signals. Therefore, the above structure can improve the communication efficiency as compared to conventional techniques.

Another aspect of the present invention is a second control device, which is the above first control device wherein (i) power line communication is performed in the communication system, (ii) the control device is connected to the networks by the one or more wired channels via a plurality of breakers provided in one-to-one correspondence with the networks, (iii) the control device further comprises the filters, which are provided in one-to-one correspondence with the networks, and (iv) the filters are connected in one-to-one correspondence to the breakers.

With the above structure, the control device pertaining to the present invention can be used as a control device for controlling the power line communication, and can be applied to a home network system and the like.

Another aspect of the present invention is a third control device, which is the above second control device further comprising a transmission/reception unit configured to transmit and receive a signal to and from communication terminals that each belong to one of the networks, wherein the transmission/reception unit transmits, to each communication terminal, a network notification signal containing network identification information for identifying one of the networks to which the communication terminal belongs.

With the above structure, each communication terminal can acknowledge the network identification information for itself. Accordingly, each communication terminal can, for example, notify the network to which it belongs to other communication terminals by adding, to a communication packet to be transmitted thereby, the network identification information notified thereto. Furthermore, with use of the network identification information, each communication terminal can judge whether it should transmit a communication packet during the intra-network communication period or the inter-network communication period.

Another aspect of the present invention is a fourth control device, which is the above third control device wherein (i) when the network notification signal is transmitted, the control unit places (a) one of the filters that corresponds to one of the networks in the passable state, and (b) the rest of the filters that corresponds to the rest of the networks in the blocked state, and (ii) the transmission/reception unit transmits the network notification signal by broadcast.

With the above structure, the control device need not generate a communication packet addressed to each communication terminal to notify the network identification information. This can reduce the processing load of the control device when, for example, a large number of communication terminals belong to a certain network.

Another aspect of the present invention is a fifth control device, which is the above third control device wherein the transmission/reception unit transmits, to each communication terminal, a communication period signal that specifies the inter-network communication period and the intra-network communication period determined for one of the networks to which the communication terminal belongs.

With the above structure, the inter-network communication period and the intra-network communication period can be notified to each communication terminal. As a result, each communication terminal can transmit a communication packet with a distinction between communication packets that can be transmitted during the inter-network communication period and communication packets that can be transmitted during the intra-network communication period. This can improve the efficiency of communication processing.

Another aspect of the present invention is a sixth control device, which is the above fifth control device wherein (i) the transmission/reception unit judges whether inter-network communication has not been performed for a predetermined period during the inter-network communication period, the inter-network communication being communication between communication terminals that belong to different networks from each other, and (ii) when the transmission/reception unit judges that the inter-network communication has not been performed for the predetermined period during the inter-network communication period, the communication management unit shortens the inter-network communication period.

Here, in the above sixth control device, the transmission/reception unit transmits the communication period signal in succession.

The above structure enables the communication management unit to adjust the lengths of the inter-network communication period and the intra-network communication period. This can further improve the communication efficiency between communication terminals.

Another aspect of the present invention is an eighth control device, which is the above third control device further comprising a relay control unit configured to relay a communication packet transmitted to and received by communication terminals that belong to different networks from each other.

The above structure can improve the degree of certainty at which an attenuated signal is transferred to the destination communication terminal by the relay control unit relaying that signal.

Another aspect of the present invention is a ninth control device, which is the above eighth control device wherein (i) at least one of the networks uses a communication protocol different from a communication protocol used by the rest of the networks, and (ii) the relay control unit bridges the different communication protocols.

With the above structure, communication between two networks that operate in accordance with different protocols from each other can be performed without any communication defects attributed to the difference in the communication protocols.

Another aspect of the present invention is a tenth control device, which is the above third control device wherein during the inter-network communication period, the control unit places only one or more of the filters provided on a part of the one or more wired channels connecting between a first network and a second network in the passable state, the first and second networks being included in the networks.

The above structure only enables the inter-network communication between a communication terminal belonging to a certain first network and a communication terminal belonging to a second network. This can suppress attenuation of signals pertaining to communication packets during the inter-network communication as much as possible, since other networks are disconnected to the first and second networks.

Another aspect of the present invention is a first communication terminal belonging to one of a plurality of networks that are connected to one another by one or more wired channels, the networks and a control device being included in a communication system, the first communication terminal comprising: a transmission/reception unit configured to transmit and receive a signal to and from the control device and other communication devices; and an access control unit configured to perform control so that (i) the communication terminal performs communication with another communication terminal belonging to another one of the networks during an inter-network communication period where a filter provided between said one of the networks to which the communication terminal belongs and said another one of the networks to which said another communication terminal belongs is placed in a passable state by the control device, and (ii) the communication terminal performs communication with another communication terminal belonging to said one of the networks to which the communication terminal belongs during an intra-network communication period where any filter provided between said one of the networks to which the communication terminal belongs and the rest of the networks is placed in a blocked state by the control device.

The above communication terminal can distinguish between two communication periods notified from the control device, namely the inter-network communication period and the intra-network communication period, and therefore offers better communication efficiency than conventional techniques.

Another aspect of the present invention is a second communication terminal, which is the above first communication terminal wherein the transmission/reception unit (i) receives, from the control device, a signal containing network identification information which indicates a network identification number allocated to said one of the networks to which the communication terminal belongs, and (ii) when performing communication with another communication terminal, transmits a packet containing the network identification number allocated to said one of the networks to which the communication terminal belongs.

Another aspect of the present invention is a third communication terminal, which is the above second communication terminal wherein (i) the transmission/reception unit receives, from another communication terminal, a packet containing a network identification number allocated to one of the networks to which said another communication terminal belongs, and (ii) the communication terminal further comprises a partner terminal judgment unit configured to (a) when the network identification number contained in the packet received from said another communication terminal matches the network identification number allocated to said one of the networks to which the communication terminal belongs, judge that said another communication terminal and the communication terminal belong to the same network, and (b) when the network identification number contained in the packet received from said another communication terminal does not match the network identification number allocated to said one of the networks to which the communication terminal belongs, judge that said another communication terminal and the communication terminal belong to different networks from each other.

Another aspect of the present invention is a fourth communication terminal, which is the above third communication terminal wherein (i) the transmission/reception unit receives, from the control device, a signal containing period setting information indicating the inter-network communication period and the intra-network communication period, and (ii) the access control unit controls communication in accordance with the period setting information.

The above communication terminal can notify other communication terminals of the network identification number for the network to which it belongs. This way, for example, upon performing communication with other communication terminals, each communication terminal can distinguish between communication packet that should be transmitted during the intra-network communication period and communication packets that should be transmitted during the inter-network communication period.

Another aspect of the present invention is a fifth communication terminal, which is the above fourth communication terminal wherein (i) intra-network communication is allowed to be performed during the inter-network communication period, and (ii) the access control unit performs control so that inter-network communication is prioritized over the intra-network communication during the inter-network communication period.

During the inter-network communication period, the above communication terminal prioritizes the inter-network communication over the intra-network communication. Accordingly, the above communication terminal can reliably perform both of the inter-network communication and the intra-network communication. This can prevent a situation where one of the inter-network communication and the intra-network communication cannot be performed.

The following describes a control device and a power line communication system incorporating the control device, which pertain to an embodiment of the present invention, with reference to the accompanying drawings.

Embodiment 1

Structure

Figure 2:
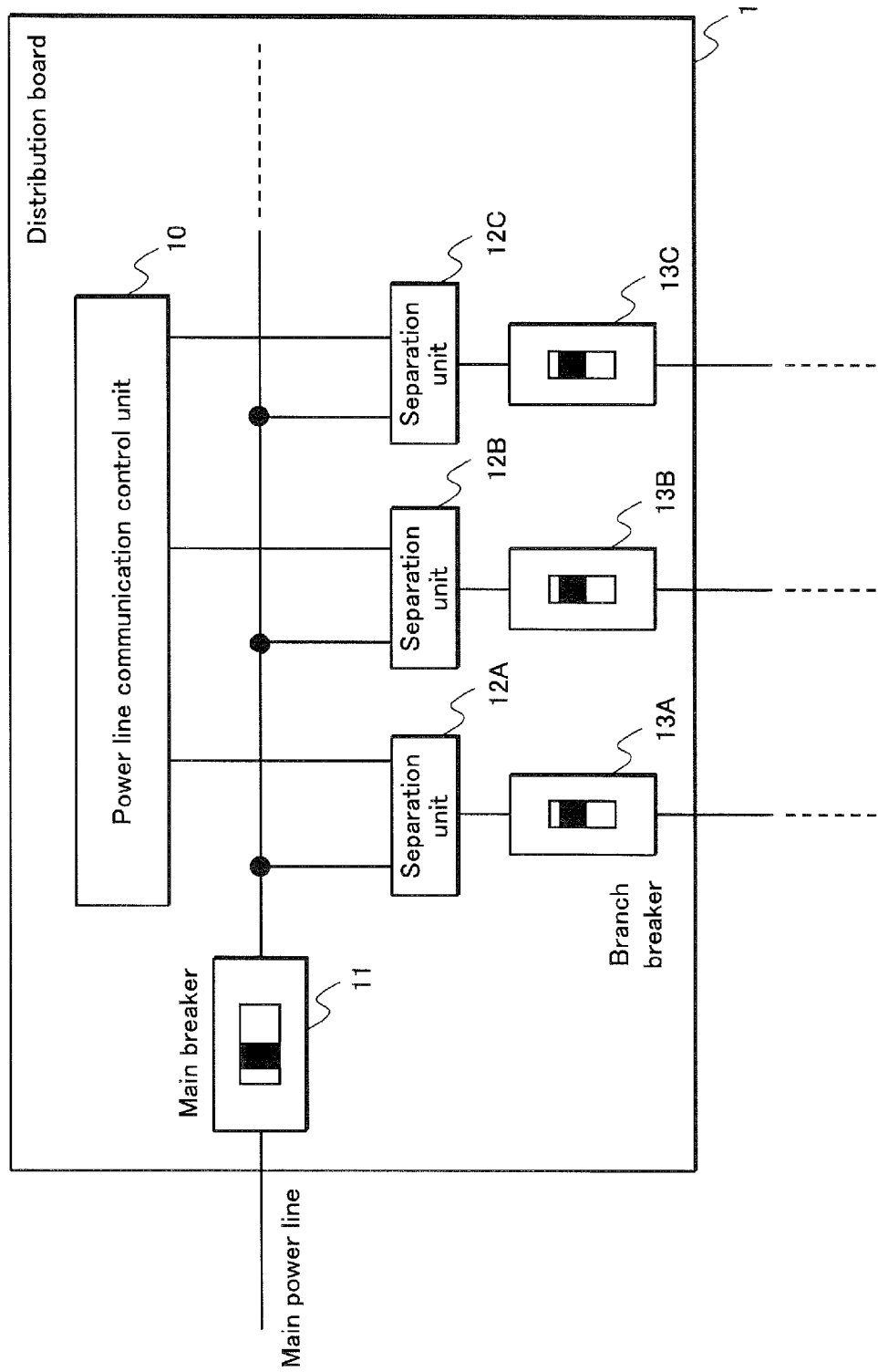
FIG. 2 is a block diagram showing an example of the functional structure of a distribution board pertaining to Embodiment 1.

FIG. 1 shows an example of a system structure of a power line communication system pertaining to Embodiment 1. FIG. 2 shows an example of the structure of a distribution board 1 included in the power line communication system.

The power line communication system shown in FIG. 1 is composed of a distribution board 1 and a plurality of communication terminals each of which is connected to a power line that is connected to the distribution board 1 and belongs to one of three different systems. In the power line communication system shown in FIG. 1, communication terminals 21A, 22A and 23A belong to one system, communication terminals 21B and 22B belong to another system, and communication terminals 21C and 22C belong to yet another system. The communication terminals 21A to 23A are connected to a branch breaker 13A. The communication terminals 21B and 22B are connected to a branch breaker 13B. The communication terminals 21C and 22C are connected to a branch breaker 13C. As shown in FIG. 2, the branch breakers 13A, 13B and 13C are included in the distribution board 1.

In the power line communication system shown in FIG. 1, communication is performed via power lines. For example, in a case where one of the communication terminals is the air conditioning equipment, other devices can notify the air conditioning equipment of the ON/OFF settings, temperature settings, etc. of the air conditioning via wired channels.

Each of the communication terminals shown in FIG. 1 can perform communication with other communication terminals belonging to the same system without involving the distribution board 1. However, when each communication terminal performs communication with a communication terminal belonging to other systems, the communication must be performed via branch breakers, i.e., the distribution board 1. FIG. 2 illustrates an example case where three systems, namely three branch breakers, are present in the distribution board 1. This, however, is merely an example. In the present embodiment, the number of systems is not limited as long as there are two or more systems. For example, there may be four or five systems, or there may be only two systems. Below, in the present embodiment, a system constituted by one branch breaker and communication terminals connected to this branch breaker is referred to as a network (or system).

It should be noted that each communication terminal is connected to a different one of electrical outlets. Open circles drawn in FIG. 1 represent electrical outlets to which no communication terminals are connected.

FIG. 2 shows the internal structure of the distribution board 1 pertaining to the present embodiment. As shown in FIG. 2, the distribution board 1 is composed of a main breaker 11, separation units 12A, 12B and 12C, branch breakers 13A, 13B and 13C, and a power line communication control unit 10. The communication terminals 21A to 23A shown in FIG. 1 are connected to the branch breaker 13A in the distribution board 1. The communication terminals 21B and 22B shown in FIG. 1 are connected to the branch breaker 13B in the distribution board 1. The communication terminals 21C and 22C shown in FIG. 1 are connected to the branch breaker 13C in the distribution board 1.

The main breaker 11 is connected to a main power line to which power is supplied from outside, and has a function to supply the supplied power to each of the separation units 12A to 12C.

As shown in FIG. 2, each of the separation units 12A to 12C is connected to the main breaker 11, the power line communication control unit 10, and a corresponding one of the branch breakers.

Each of the separation units 12A to 12C has a function to separate an input signal into a power waveform and a high-frequency signal, which is a communication signal. For example, in power line communication, a high-frequency signal having a frequency of 2 MHz to 30 MHz is superimposed as a communication signal onto a power signal having a frequency of 50 Hz or 60 Hz. In order to analyze the details of communication, the high-frequency signal must be separated from the power waveform. It should be noted that the above values of frequency are merely examples.

Each of the separation units 12A to 12C also has the following functions: (i) supplying a power signal supplied from the main breaker 11 to the corresponding one of the branch breakers 13A to 13C; (ii) supplying a communication signal supplied from the power line communication control unit 10 to the corresponding one of the branch breakers 13A to 13C; and (iii) supplying a communication signal from the corresponding one of the branch breakers 13A to 13C to the power line communication control unit 10.

The power line communication control unit 10 has a function to perform transmission and reception of a communication signal. The power line communication control unit 10 also has the following functions: (i) controlling ON/OFF of filters; and (ii) notifying each communication terminal of an inter-breaker communication priority period and an intra-breaker communication period. During the inter-breaker communication priority period, each communication terminal belonging to any of the branch breakers 13A to 13C can communicate with communication terminals belonging to other branch breakers. During the intra-breaker communication period, each communication terminal belonging to any of the branch breakers 13A to 13C can communicate only with other communication devices belonging to the same breaker.

Figure 3:
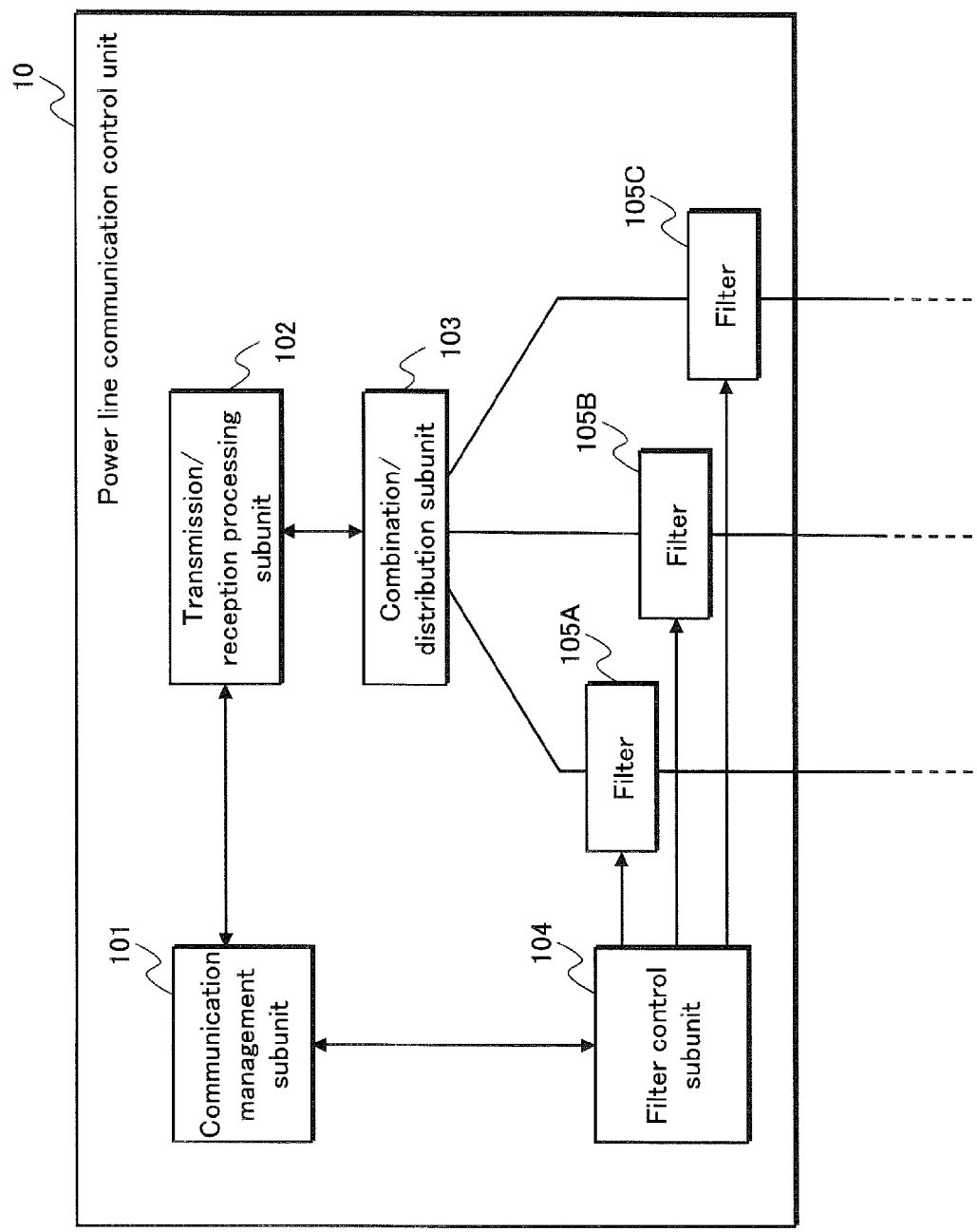
FIG. 3 is a block diagram showing an example of the functional structure of a power line communication control unit pertaining to Embodiment 1.

The following describes the details of the power line communication control unit 10 with reference to FIG. 3.

FIG. 3 is a block diagram showing an example of the functional structure of the power line communication control unit 10 pertaining to the present embodiment.

As shown in FIG. 3, the power line communication control unit 10 is composed of a communication management subunit 101, a transmission/reception processing subunit 102, a combination/distribution subunit 103, a filter control subunit 104, and filters 105A, 105B and 105C.

The communication management subunit 101 has a function to transmit a beacon signal and manage transmission periods. The beacon signal is used to control communication timings so that the communication terminals are in synchronization with one another. The communication management subunit 101 also has a function to transmit pieces of information to be included in a beacon signal to be transmitted to the transmission/reception processing subunit 102 (i.e., time information indicating a transmission timing of a beacon signal and a transmission timing of the next beacon signal, and period setting information specifying the inter-breaker communication priority period and the intra-breaker communication period). The communication management subunit 101 also has the following functions: (i) outputting, to the filter control subunit 104, an instruction to place the filters in a passable state at a timing when the beacon signal is transmitted and at a timing when the inter-breaker communication priority period starts; and (ii) outputting, to the filter control subunit 104, an instruction to place the filters in a blocked state at a timing when the intra-breaker communication period starts.

The transmission/reception processing subunit 102 has a function to perform transmission and reception associated with power line communication. The transmission/reception processing subunit 102 also has a function to transmit a beacon signal transmitted from the communication management subunit 101 to the combination/distribution subunit 103.

The transmission/reception processing subunit 102 also has the following functions: (i) detecting whether or not inter-breaker communication has been performed for a predetermined time period during the inter-breaker communication priority period, by checking whether or not communication packets are being exchanged via the combination/distribution subunit 103; and (ii) when the inter-breaker communication has not been performed for the predetermined time period during the inter-breaker communication priority period, notifying the communication management subunit 101 to that effect.

The combination/distribution subunit 103 has a function to combine and distribute power line communication signals. It is preferable that the combination/distribution subunit 103 be structured to conform to the characteristic impedance of the power lines so as to suppress reflection of the communication signals. The combination/distribution subunit 103 also has the following functions: (i) transmitting a signal transmitted from the transmission/reception processing subunit 102 to each of the filters 105A to 105C; and (ii) transmitting a communication signal from any of the filters 105A to 105C to another filter.

The filter control subunit 104 has a function to control ON/OFF of the filtering function of each of the filters 105A to 105C in accordance with an instruction from the communication management subunit 101, namely, a function to determine whether or not to allow a signal that is about to transit each of the filters 105A to 105C to pass through the filter.

Each of the filters 105A to 105C can operate in a passable state and a blocked state that can be switchable. In the passable state, a power line communication signal that is transmitted via one of two power lines connected to each filter can pass through the filter and is passed to the other power line. In a blocked state, each filter is blocked, and therefore the power line communication signal does not pass through the filter and is not passed to the other power line. The filters 105A, 105B and 105C are provided in correspondence with the separation units 12A, 12B and 12C, respectively. Hence, when each filter is in a blocked state, it is possible to prevent a communication signal exchanged between communication terminals performing the intra-breaker communication from being leaked to a wired channel via which communication is performed between communication terminals belonging to different breakers.

Figure 4:
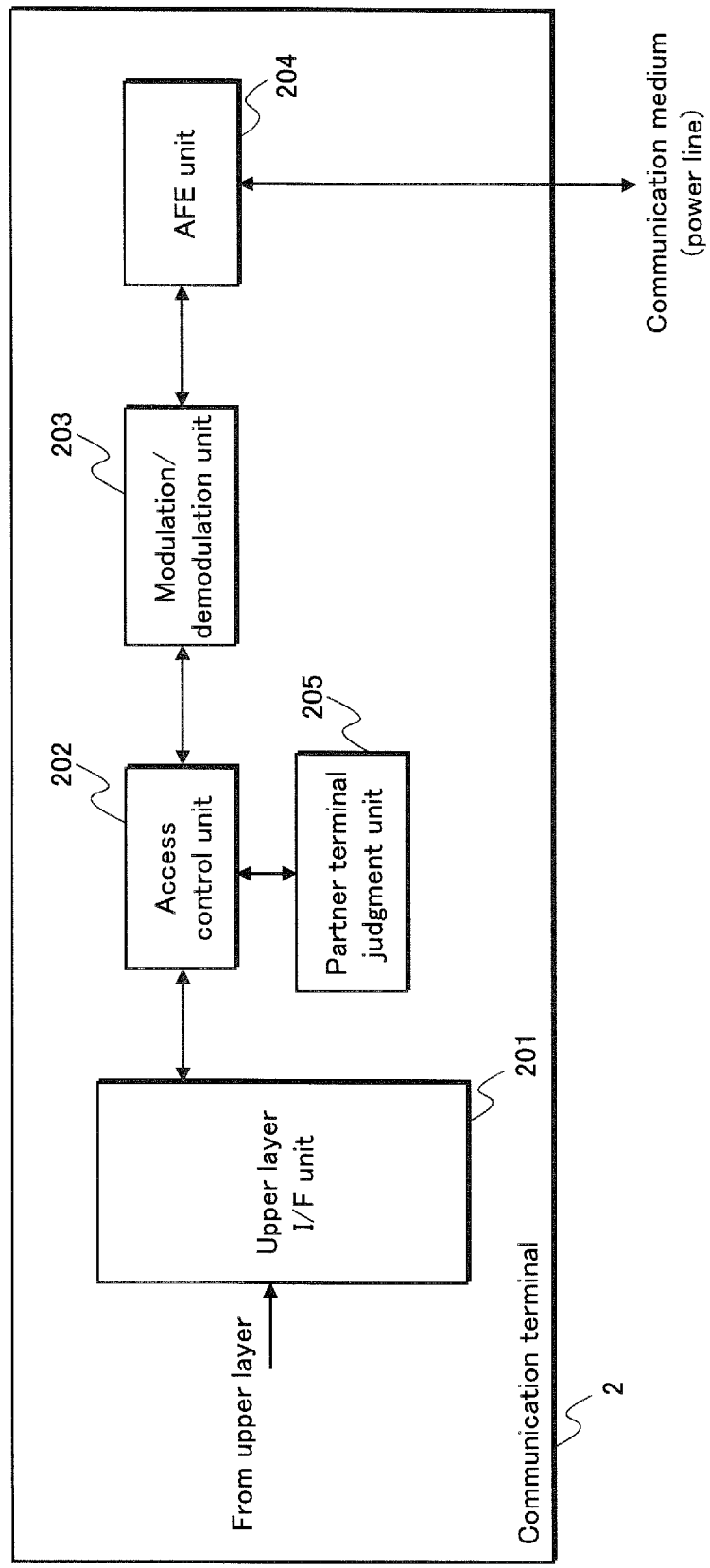
FIG. 4 is a block diagram showing an example of the functional structure of a communication terminal pertaining to Embodiment 1.

FIG. 4 is a block diagram showing the functional structure of a communication terminal connected to a corresponding network. A communication terminal may be referred to as a PLC adapter.

As shown in FIG. 4, a communication terminal includes an upper layer interface (I/F) unit 201, an access control unit 202, a modulation/demodulation unit 203, an analog front end (AFE) unit 204, and a partner terminal judgment unit 205.

The upper layer I/F unit 201 has the following functions: (i) transmitting, to the access control unit 202, transmission data received from an upper layer; and (ii) transmitting, to the upper layer, reception data received from the access control unit 202.

The access control unit 202 has the following functions: (i) generating a transmission frame by appending a cyclic redundancy check (CRC) code to the transmission data received from the upper layer I/F unit 201 and by performing the framing processing; and (ii) transmitting the reception data to the upper layer I/F unit 201 after performing the CRC and the reception processing on a signal demodulated by the modulation/demodulation unit 203. The access control unit 202 also has a function to perform (i) monitoring of a communication status of a medium, i.e., a channel, (ii) transmission control, and (iii) control on retransmission of the transmission data when the transmitted signal has not been properly received by a receiving communication terminal. The access control unit 202 also has a function to (i) receive a communication packet and (ii) when the communication packet has been properly received (i.e., with the CRC cleared), transmit an ACK signal to a transmission source communication terminal via the modulation/demodulation unit 203 and the AFE unit 204.

The modulation/demodulation unit 203 has the following functions: (i) modulating a transmission signal input from the access control unit 202, and transmitting the modulated transmission signal to the AFE unit 204; and (ii) demodulating a reception signal input from the AFE unit 204, and transmitting the demodulated reception signal to the access control unit 202.

The AFE unit 204 has a function to (i) perform D/A conversion, which is to convert a transmission signal generated by the modulation/demodulation unit 203 from a digital signal to an analog signal, (ii) superimpose the analog signal, which is obtained as a result of the D/A conversion, onto a channel, and (iii) transmit the superimposed analog signal. The AFE unit 204 also has a function to (i) extract a signal from a power line, (ii) after performing analog gain control (AGC) so as to give a desired power to the extracted signal, perform A/D conversion, which is to convert the extracted signal from an analog signal to a digital signal, and (iii) transmit the digital signal, which is obtained as a result of the A/D conversion, to the modulation/demodulation unit 203.

The partner terminal judgment unit 205 has a function to judge whether a partner communication terminal, with which the own communication terminal is to perform communication (i.e., the transmission destination of the communication packet), belongs to the same network (system) as the own communication terminal or belongs to a different network (system) from the own communication terminal. This judgment is made by judging whether or not the network ID of the network to which the own communication terminal belongs matches the network ID of the network to which the transmission destination of the data belongs. The partner terminal judgment unit 205 performs this judgment in accordance with an instruction from the access control unit 202, and transmits a result of this judgment to the access control unit 202.

(Data)

FIGS. 5A to 5D show examples of the data structure of a communication packet used in a communication system pertaining to the present embodiment.

FIG. 5A shows a concept of the data structure of a communication packet.

As shown in FIG. 5A, a communication packet is composed of a physical address, a logical address, a breaker ID, and upper layer data. The physical address consists of a combination of a physical address of a transmission destination device and a physical address of a transmission source device. The logical address consists of a combination of a logical address of a transmission destination device and a logical address of a transmission source device. The breaker ID is an identifier for the breaker associated with the address to which the transmission source device belongs. The upper layer data is the actual data used in the actual communication, i.e., the data to be transmitted to the transmission destination.

FIG. 5B shows a communication packet transmitted from a communication terminal A1 to a communication terminal B1. In this communication packet, the physical address of the communication terminal B1 is set as the physical address of the transmission destination; the physical address of the communication terminal A1 is set as the physical address of the transmission source; the logical address of the communication terminal B1 is set as the logical address of the transmission destination; the logical address of the communication terminal A1 is set as the logical address of the transmission source; and an identification number indicating a branch breaker 13A is set as the breaker ID.

The details of communication packets shown in FIGS. 5C and 5D will be described in Embodiment 2.

(Operations)

Described below are the operations of the power line communication system pertaining to the present Embodiment 1.

(System Operations)

The following describes the operations of the power line communication system pertaining to the present Embodiment 1 with reference to the timing chart shown in FIG. 6.

As shown in FIG. 6, in the power line communication system pertaining to the present embodiment, two periods—the inter-breaker communication priority period T1 and the intra-breaker communication period T2—are set between the time when transmission of a beacon signal is completed and the time when transmission of the next beacon signal is started.

The top row of FIG. 6 illustrates the details of communication packets exchanged in the entire power line communication system. The quadrilaterals illustrated in FIG. 6 denote the following: (i) in the second row, signals transmitted by the distribution board (power line communication control unit 10); (ii) in the third row, signals transmitted and received by communication terminals belonging to the branch breaker 13A; (iii) in the fourth row, signals transmitted and received by communication terminals belonging to the branch breaker 13B; and (iv) in the fifth row, signals transmitted and received by communication terminals belonging to the branch breaker 13C. Note that in the second to fifth rows in FIG. 6, the quadrilaterals drawn with solid lines indicate transmission, and the quadrilaterals drawn with dotted lines indicate reception. Also note that in FIG. 6, each alphabetical letter denotes one of the communication terminals belonging to a breaker indicated by that alphabetical letter.

During the inter-breaker communication priority period T1, the inter-breaker communication performed between communication terminals belonging to different breaker systems is prioritized. During the intra-breaker communication period T2, only the intra-breaker communication between communication terminals belonging to the same breaker system is performed. The following explains the operations performed by the distribution board 1 and the communication terminals during the inter-breaker communication priority period T1 and the intra-breaker communication period T2.

As apparent from FIG. 6, in the communication system pertaining to the present Embodiment 1, communication performed during the inter-breaker communication priority period T1 is not bound by the networks (systems) that are categorized according to the breakers. On the other hand, during the intra-breaker communication period T2, communication between communication terminals belonging to the same breaker—i.e., communication within a single network (system)—is performed. In FIG. 6, the inter-breaker communication priority period T1 is depicted as incorporating a TDMA method in which every system communicates with all of the other systems (A to B, A to C, B to A, B to C, C to A, and C to B). However, the inter-breaker communication priority period T1 is not limited to such configuration. Alternatively, for example, communication from a communication terminal belonging to the branch breaker 13A to a communication terminal belonging to the branch breaker 13B may be performed in succession. The form of communication shown in FIG. 6 is realized because each communication terminal performs communication at a timing when no other communication is being performed on the power lines.

(Beacon Transmission Operations of Power Line Communication Control Unit 10)

The following briefly explains transmission of a beacon signal by the power line communication control unit 10. The power line communication control unit 10 in the distribution board 1 transmits a beacon signal at a predetermined interval. A beacon signal includes (i) time information indicating a transmission timing of the beacon signal and a transmission timing of the next beacon signal, and (ii) period setting information indicating a start time and an end time of each of the inter-breaker communication priority period T1 and the intra-breaker communication period T2. The inter-breaker communication priority period T1 and the intra-breaker communication period T2 are set between two consecutive beacon signals.

The communication management subunit 101 of the power line communication control unit 10 (i) counts a predetermined time period between beacon signal transmissions by using a time counter, and (ii) transmits, to the transmission/reception processing subunit 102, pieces of information to be transmitted as a beacon signal (i.e., the time information and the period setting information) at a timing of transmission of the beacon signal. At this time, the communication management subunit 101 also instructs the filter control subunit 104 to place all the filters 105A to 105C in a passable state. The transmission/reception processing subunit 102 generates a beacon signal based on the transmitted pieces of information, and transmits the generated beacon signal to the combination/distribution subunit 103. The combination/distribution subunit 103 modulates the transmitted beacon signal, superimposes the modulated beacon signal onto a power signal, and outputs the resultant beacon signal to each communication terminal. At this time, the beacon signal can be transmitted to each communication terminal because the filter control subunit 104 has placed all the filters 105A to 105C in the passable state.

(Operations of Communication Terminal)

Upon receiving the beacon signal, each communication terminal identifies the inter-breaker communication priority period T1 and the intra-breaker communication period T2 based on the period setting information included in the beacon signal, and performs medium access control—i.e., communication with other communication terminals—in correspondence with each of these periods.

To be more specific, gain control is performed on the signal that is received by the AFE unit 204 and includes the period setting information. The resultant signal is input to the modulation/demodulation unit 203. The modulation/demodulation unit 203 demodulates the received signal in accordance with a predetermined modulation method, and outputs the demodulated signal to the access control unit 202. The access control unit 202 recognizes the start time and the end time of each of the inter-breaker communication priority period T1 and the intra-breaker communication period T2 by analyzing the period setting information included in the demodulated signal input thereto. Then, in accordance with these periods T1 and T2, the access control unit 202 performs transmission and reception of communication packets until it receives the next beacon signal.

During the inter-breaker communication priority period T1, the access control unit 202 of each communication terminal performs medium access control so as to place priority on the inter-breaker communication, which is communication between communication terminals connected to different systems. Examples of the medium access control include such methods as carrier sense multiple access with collision avoidance (CSMA/CA) and time division multiple access (TDMA).

In the CSMA/CA method, each communication terminal that is about to start communication checks if there are any other communication terminals that are performing communication by carrier sensing, and when it is judged that there are no such communication terminals, stands by for a back-off period that is a randomly-selected one of predetermined setting ranges. Then each communication terminal starts communication if no other communication terminals start communication until the back-off period elapses. On the other hand, in the TDMA method, all communication terminals that participate in communication are synchronized with one another, and each of these communication terminals performs communication either during a time period specified by a control station such as a master station, or in the order specified by the control station.

The following describes an example case in which the CSMA/CA method is used as a method for the medium access control. It should be noted that the CSMA/CA method is merely an example. Communication incorporating the TDMA method may be performed during at least part of the inter-breaker communication priority period T1 and the intra-breaker communication period T2. In this case, the control station (e.g., the power line communication control unit 10) allocates the following (i) and (ii) to communication performed between communication terminals: (i) a predetermined period which is part of the inter-breaker communication priority period T1 if this communication is the inter-breaker communication; and (ii) a predetermine period which is part of the inter-breaker communication priority period T1 or part of the intra-breaker communication period T2 if this communication is the intra-breaker communication. It should be noted that in order to increase the amount of data that can be transmitted and received in the entire communication system as much as possible, every intra-breaker communication is preferably allocated during the intra-breaker communication period T2.

In the CSMA/CA method, priority control can be realized in the following manner: a setting range serving as a back-off period for a communication terminal that is standing by to start transmission of high-priority data is made shorter than a setting range serving as a back-off period for another communication terminal that is standing by to start transmission of low-priority data. Note that high-priority data denotes an inter-breaker communication packet, which is a communication packet transmitted and received between communication terminals belonging to different branch breaker systems from one another. On the other hand, low-priority data denotes an intra-breaker communication packet, which is a communication packet transmitted and received between communication terminals belonging to the same branch breaker system.

By performing the above medium access control, during the inter-breaker communication priority period T1, transmission of inter-breaker communication packets is prioritized, and transmission of intra-breaker communication packets is also possible if no inter-breaker communication packets are being transmitted. Therefore, the above medium access control can make an effective use of the inter-breaker communication priority period T1.

When the end time of the inter-breaker communication priority period T1 approaches, the access control unit 202 of each communication terminal adjusts the length of packets to be transmitted so that transmission of packets and reception of an ACK confirming the safe arrival of the packets are completed by the end time of the inter-breaker communication priority period T1. The access control unit 202 of each communication terminal puts off transmission of the packets when it is judged that transmission of the packets and reception of the ACK cannot be completed by the end time of the inter-breaker communication priority period T1. When the packets whose transmission is put off are inter-breaker communication packets, transmission of these packets is put on hold until the next inter-breaker communication priority period T1.

The following describes a method used by the partner terminal judgment unit 205 of each communication terminal to judge whether a partner communication terminal belongs to the same system as or a different system from the own communication terminal.

A communication packet transmitted and received by each communication terminal includes, in its header portion, the physical address of the communication terminal as well as the breaker identification number for the system to which the communication terminal belongs. Each communication terminal transmits/receives a packet to/from another communication terminal (partner communication terminal) while establishing connection to start communication with the partner communication terminal. Each communication terminal obtains the physical address and the breaker identification number included in the packet received from the partner communication terminal, and stores, into a table (not illustrated) held by the partner terminal judgment unit 205 therein, these obtained physical address and breaker identification number pertaining to the partner communication terminal in correspondence.

The partner terminal judgment unit 205 in each communication terminal judges that the partner communication terminal belongs to the same breaker as the own communication terminal when the breaker identification number for the system to which the own communication terminal belongs matches the breaker identification number for the system to which the partner communication terminal belongs. In this case, the partner terminal judgment unit 205 in each communication terminal stores transmission packets to be addressed to the partner communication terminal into a transmission queue for intra-breaker communication. On the other hand, the partner terminal judgment unit 205 in each communication terminal judges that the partner communication terminal belongs to a different breaker system from the own communication terminal when the breaker identification number for the system to which the own communication terminal belongs is different from the breaker identification number for the system to which the partner communication terminal belongs. In this case, the partner terminal judgment unit 205 in each communication terminal stores transmission packets to be addressed to the partner communication terminal into a transmission queue for inter-breaker communication. Each communication terminal selects a packet to be retrieved from one of the above transmission queues depending on whether it is currently in the inter-breaker communication priority period T1 or the intra-breaker communication period T2, and performs transmission processing.

(Change of T1 and T2 by Power Line Communication Control Unit 10)

Depending on the status of communication, it is possible to move the end time of the inter-breaker communication priority period T1 forward to get an early start on the intra-breaker communication period T2.

The power line communication control unit 10 monitors the state of communication throughout the entire network during the inter-breaker communication priority period T1. During the monitoring, when the power line communication control unit 10 judges that (i) the inter-breaker communication has not been performed for a predetermined time period, or (ii) the number of communication packets transmitted during the inter-breaker communication priority period T1 is smaller than a predetermined number, the power line communication control unit 10 performs broadcast transmission of an end notification packet for notifying the end of the inter-breaker communication priority period T1 and the start of the intra-breaker communication period T2. Upon receiving this end notification packet, each communication terminal acknowledges that the inter-breaker communication priority period T1 has ended, and commences an operation corresponding to the intra-breaker communication period T2.

By thus moving the end of the inter-breaker communication priority period T1 and the start of the intra-breaker communication period T2 forward, the intra-breaker communication period T2, during which communication between communication terminals belonging to the same system can be performed in parallel, is prolonged. This increases the amount of data that can be transmitted and received throughout the entire power line communication system.

While monitoring the status of communication throughout the entire system, the power line communication control unit 10 may (i) determine a temporal ratio between the inter-breaker communication priority period T1 and the intra-breaker communication period T2 so as to spread the load in terms of a temporal band occupancy, the number of terminals, etc., and (ii) notify the inter-breaker communication priority period T1 and the intra-breaker communication period T2, which are calculated from the determined temporal ratio, to each communication terminal by a beacon signal.

Once the intra-breaker communication period T2 starts, the communication management subunit 101 of the power line communication control unit 10 notifies the filter control subunit 104 that it is currently in the intra-breaker communication period T2. Upon being notified that it is currently in the intra-breaker communication period T2, the filter control subunit 104 causes each of the filters 105A to 105C to block high-frequency signals so that signals transmitted through a power line connected to one breaker do not leak into power lines connected to other breakers.

During the intra-breaker communication period T2, each communication terminal transmits only intra-breaker communication packets, which are addressed to another communication terminal belonging to the same breaker, and does not transmit any inter-breaker communication packets, which are addressed to a communication terminal connected to another breaker system.

(Operations of Power Line Communication Control Unit 10 to Notify Breaker Identification Number)

The following describes a method used by the power line communication control unit 10 to notify a breaker identification number to each communication terminal Note that a breaker identification number is for identifying to which network (system) each communication terminal belongs in the communication system, and is equivalent to what is called a network ID in the communication system.

The power line communication control unit 10 uses the intra-breaker communication period T2 to periodically notify terminals belonging to each breaker of a breaker identification number for that breaker. Breaker identification numbers are unique numbers that are allocated one-to-one to breakers. The following describes an example of a method of notifying a breaker identification number to each communication terminal belonging to the system of the branch breaker 13A. At a timing when the breaker identification number is intended to be notified to each communication terminal belonging to the system of the branch breaker 13A, the communication management subunit 101 performs control so as to place only the filter 105A in a passable state during the intra-breaker communication period T2. At this time, the filters 105B and 105C remain in a blocked state. While the filters are being controlled in the above manner, the power line communication control unit 10 participates in the network of the system of the branch breaker 13A, and transmits a breaker ID notification packet that contains an identification number for the branch breaker 13A during an idle period, in which no communication is performed in the network. The power line communication control unit 10 also transmits a breaker ID notification packet to terminals belonging to other breakers in a similar manner. Consequently, each communication terminal can obtain an identification number for a breaker to which it belongs.

Although it has been described above that the breaker identification number is notified by using the intra-breaker communication period T2, the breaker identification number may be notified at a timing other than during the intra-breaker communication period T2. For example, at the time of a system startup, it is permissible to set a timing at which the breaker identification number should be notified as initialization processing to be performed before each communication terminal performs communication. It should be noted that the above-described method of using the intra-breaker communication period T2 is suitable to notify a breaker identification number to a new communication terminal that has just been connected to a network (system).

Embodiment 2

In the above Embodiment 1, the power line communication control unit 10 is structured to simply control ON/OFF of the filters. The present Embodiment 2 further discloses suppression of attenuation of signal levels by relaying signals—i.e., by making the power line communication control unit 10 relay the communication packets.

In the present Embodiment 2, the description of the technical details that are the same as in Embodiment 1 is omitted, and only the technical details that are different from Embodiment 1 are described.
(Structure)

FIG. 7 is a functional block diagram showing the structure of the power line communication control unit 10 pertaining to Embodiment 2. Structural elements of the power line communication control unit 10 that are the same as in Embodiment 1 have the same reference numbers thereas in FIG. 7, and are omitted from the following description.

Unlike the power line communication control unit 10 pertaining to Embodiment 1, the power line communication control unit 10 pertaining to Embodiment 2 includes a relay control subunit 106.

When the power line communication control unit 10 receives, from each communication terminal, a communication packet in which the physical address of the destination indicates the power line communication control unit 10 (the distribution board), the relay control subunit 106 generates a communication packet by (i) changing the physical address of the destination included in the received communication packet to the physical address of a device indicated by the logical address of the destination included in the received communication packet, and (ii) changing the physical address of the transmission source included in the received communication packet to the physical address of the power line communication control unit 10. The relay control subunit 106 then outputs the generated communication packet. The output communication packet is transmitted to the destination communication terminal belonging to one of the breakers via the corresponding filter.

Meanwhile, the communication terminals pertaining to Embodiment 2 have the structure shown in FIG. 4, but further have the following functions.

Each communication terminal stores therein addresses and breaker identification numbers of all communication terminals that each belong to one of the networks. These pieces of information may be stored using one of a wide variety of methods. The details of such methods are omitted from the following description. The following explains one example of such methods. Each communication terminal broadcasts its address and breaker identification number, which is notified by the power line communication control unit, by using the inter-breaker communication priority period T1. Each communication terminal hence stores therein, in correspondence, the addresses and breaker identification numbers that have been broadcast by other communication terminals.

When transmitting a communication packet, the access control unit 202 of each communication terminal inquires the partner terminal judgment unit 205 about whether the communication terminal to which the communication packet is to be transmitted (hereinafter "destination communication terminal") belongs to the same breaker system as or a different breaker system from the own communication terminal.

Based on the address set as a transmission destination of the communication packet, the partner terminal judgment unit 205 detects the stored address of another communication terminal corresponding to the address set as the transmission destination of the communication packet, and judges whether or not the breaker identification number corresponding to the detected address of another communication terminal matches the breaker identification number of the own communication terminal. When the two breaker identification numbers match, the partner terminal judgment unit 205 notifies the access control unit 202 that the destination communication terminal belongs to the same breaker as the own communication terminal. On the other hand, when the two breaker identification numbers do not match, the partner terminal judgment unit 205 notifies the access control unit 202 that the destination communication terminal belongs to a different breaker from the own communication terminal.

Upon being notified that the two breaker identification numbers match, the access control unit 202 generates a communication packet in which (i) the physical address of the destination communication terminal is set as the physical address of the destination, (ii) the physical address of the own communication terminal is set as the physical address of the transmission source, (iii) the logical address of the destination communication terminal is set as the logical address of the destination, and (iv) the logical address of the own communication terminal is set as the logical address of the transmission source. The access control unit 202 then transmits the generated communication packet to the modulation/demodulation unit 203.

On the other hand, upon being notified that the two breaker identification numbers do not match, the access control unit 202 generates a communication packet in which (i) the physical address of the power line communication control unit 10 is set as the physical address of the destination, (ii) the physical address of the own communication terminal is set as the physical address of the transmission source, (iii) the logical address of the destination communication terminal is set as the logical address of the destination, and (iv) the logical address of the own communication terminal is set as the logical address of the transmission source. The access control unit 202 then transmits the generated communication packet to the modulation/demodulation unit 203.
(Data)

FIGS. 5C and 5D show examples of the structure of a communication packet that is relayed by the relay control subunit 106.

FIG. 5C shows an example of the structure of a communication packet transmitted from the communication terminal A1 to the communication terminal B1, the communication packet being in a state where it has been transmitted from the communication terminal A1 but is yet to transit the power line communication control unit 10 in the distribution board 1. FIG. 5D shows an example of the structure of a communication packet transmitted from the communication terminal A1 to the communication terminal B1, the communication packet being in a state where it has already transited the power line communication control unit 10 in the distribution board 1.

As shown in FIG. 5C, when the communication terminal A1 transmits a communication packet to the communication terminal B1, the logical address is used to indicate the original transmission source and the final destination of the communication packet, and the physical address is used to indicate where the data transmitted from the communication terminal A1 is actually transmitted.

Upon receiving the communication packet shown in FIG. 5C, the power line communication control unit 10 analyzes the destination indicated by the logical address set in the received communication packet, and acknowledges that this communication packet is addressed to the communication terminal B1. Since the power line communication control unit 10 can directly communicate with the communication terminal B1, it sets the physical address of the communication terminal B1 as the physical address of the communication packet, so that the communication packet is transmitted to the communication terminal B1. The power line communication control unit 10 also sets its own physical address as the physical address of the transmission source. The power line communication control unit 10 generates the communication packet shown in FIG. 5D by adding copies of the logical address and the upper layer data contained in the received communication packet, then transmits the generated communication packet.

It should be noted that the distribution board shown in FIGS. 5C and 5D actually refers to the power line communication control unit 10.

(Operations)

Figure 8:
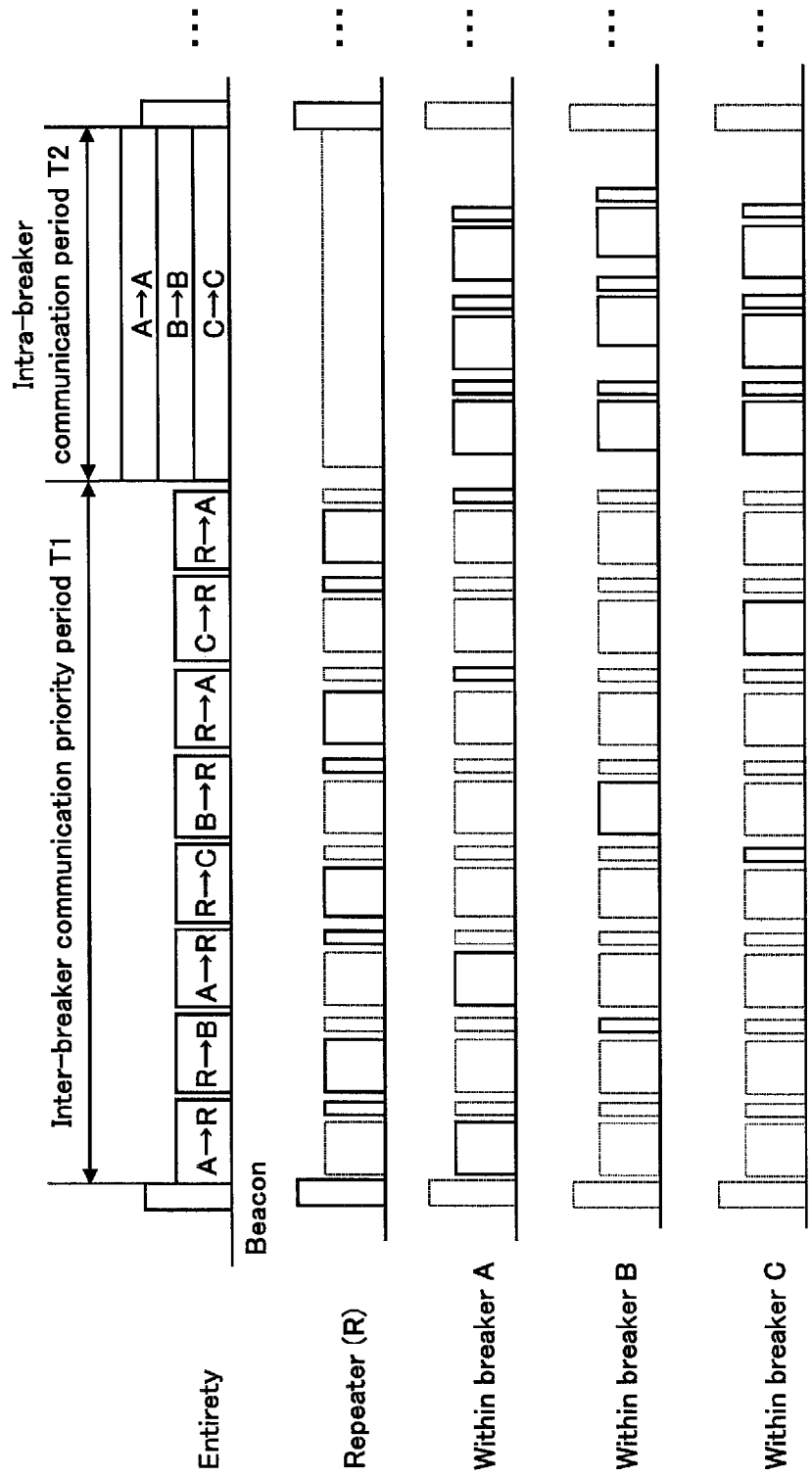
FIG. 8 shows the structure of communication periods in a beacon interval pertaining to Embodiment 2.

FIG. 8 is a timing chart showing the operations of the power line communication system pertaining to Embodiment 2. The timing chart of FIG. 8 is different from the timing chart of FIG. 6 pertaining to Embodiment 1 in that every communication packet transits the power line communication control unit 10 during the inter-breaker communication priority period T1.

In Embodiment 1, a communication packet is directly exchanged between communication terminals during the inter-breaker communication priority period T1. As opposed to this, in Embodiment 2, each communication terminal first transmits a communication packet to the power line communication control unit 10, and thereafter, the relay control subunit in the power line communication control unit 10 relays this communication packet to transmit the same to the destination communication terminal, as shown in FIG. 8. In FIG. 8, "R" denotes the power line communication control unit 10.

For example, in embodiment 1, when a communication terminal belonging to the system of the branch breaker 13A transmits a communication packet to another communication terminal belonging to the system of the branch breaker 13B during the inter-breaker communication priority period T1, the communication packet is directly transmitted and received between these two communication terminals, as indicated in FIG. 6 (A to B). On the other hand, in Embodiment 2, when a communication terminal belonging to the system of the branch breaker 13A transmits a communication packet to another communication terminal belonging to the system of the branch breaker 13B, the communication packet is first transmitted to the power line communication control unit 10, and then the relay control subunit 106 in the power line communication control unit 10 again transmits a communication packet containing the same upper layer data, as indicated in FIG. 8 (A to R, and R to B). With the above structure, communication packets can be transmitted more reliably in the inter-breaker communication.

By causing the communication packets to transit the relay control subunit in the power line communication control unit 10 as shown in FIG. 8, the communication efficiency is somewhat reduced compared to Embodiment 1. Still, by suppressing the signal attenuation, the rate of occurrence of a communication error can be reduced as much as possible.

On the other hand, as shown in FIG. 8, the level of signal attenuation is smaller in communication performed during the intra-breaker communication period T2 than in communication performed during the inter-breaker communication priority period T1 (this is because during the intra-breaker communication period T2, the networks are isolated from one another by the filters, and each network does not experience signal attenuation caused by the impedance of devices connected to other networks). Hence, during the intra-breaker communication period T2, signals are exchanged between communication terminals without being relayed by the relay control subunit 106. As communication is performed without involving the power line communication control unit 10 during the intra-breaker communication period T2, the communication efficiency can be improved accordingly during the intra-breaker communication period T2 as compared to the inter-breaker communication priority period T1.

Embodiment 3

The above Embodiment 1 has described an example in which communication terminals are grouped into networks (systems) according to the breaker systems to which the communication terminals belong. The present Embodiment 3 explains a method of grouping according to the functions of the networks (systems).

More specifically, the grouping according to the functions of the networks (systems) denotes grouping according to the types of power supplied to the respective communication terminals. The present Embodiment 3 explains an example in which communication terminals are grouped into the following two networks (systems): a network of communication terminals to which the alternating current (AC) power is supplied; and a network of communication terminals to which the direct current (DC) power is supplied. Therefore, in the present Embodiment 3, the inter-breaker communication priority period T1 and the intra-breaker communication period T2 pertaining to the above Embodiments 1 and 2 are referred to as an inter-system communication priority period and an intra-system communication period, respectively.

In the present Embodiment 3, the description of the technical details that are the same as in Embodiment 1 is omitted, and only the technical details that are different from Embodiment 1 are described.

(Structure)

Figure 9:
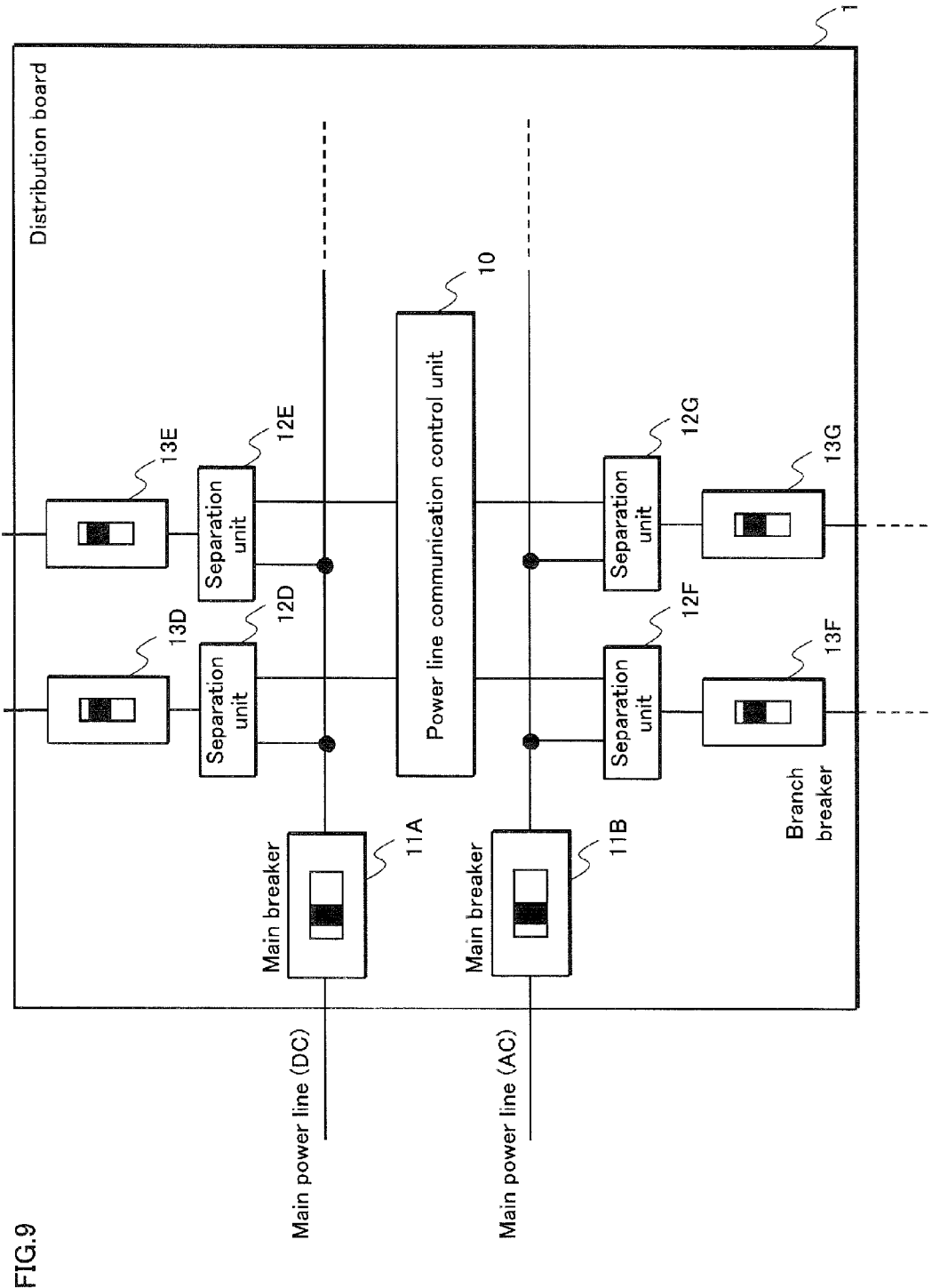
FIG. 9 is a block diagram showing an internal structure of a distribution board 1 pertaining to Embodiment 3.

FIG. 9 is a functional block diagram showing the functional structure of a distribution board 1 pertaining to Embodiment 3.

As shown in FIG. 9, the distribution board 1 pertaining to Embodiment 3 is different from the distribution board 1 pertaining to Embodiment 1 in that communication terminals are not grouped into networks (systems) according to the breakers, but are grouped into (i) a network (system) associated with a main power line through which the AC power is supplied, and (ii) a network (system) associated with a main power line through which the DC power is supplied.

As shown in FIG. 9, the distribution board 1 pertaining to Embodiment 3 includes the power line communication control unit 10, main breakers 11A and 11B, separation units 12D, 12E, 12F and 12G, and branch breakers 13D, 13E, 13F and 13G. The main breaker 11A, the separation units 12D and 12E, and the branch breakers 13D and 13E constitute the DC power system. The main breaker 11B, the separation units 12F and 12G, and the branch breakers 13F and 13G constitute the AC power system. The power line communication control unit 10 controls both of communication performed in the AC power system and communication performed in the DC power system.

Other than the fact that there are two power systems to supply power, the distribution board 1 pertaining to Embodiment 3 is the same as the distribution board 1 pertaining to Embodiments 1 and 2. Therefore, the details of the distribution board 1 are omitted from the following description.

Figure 10:
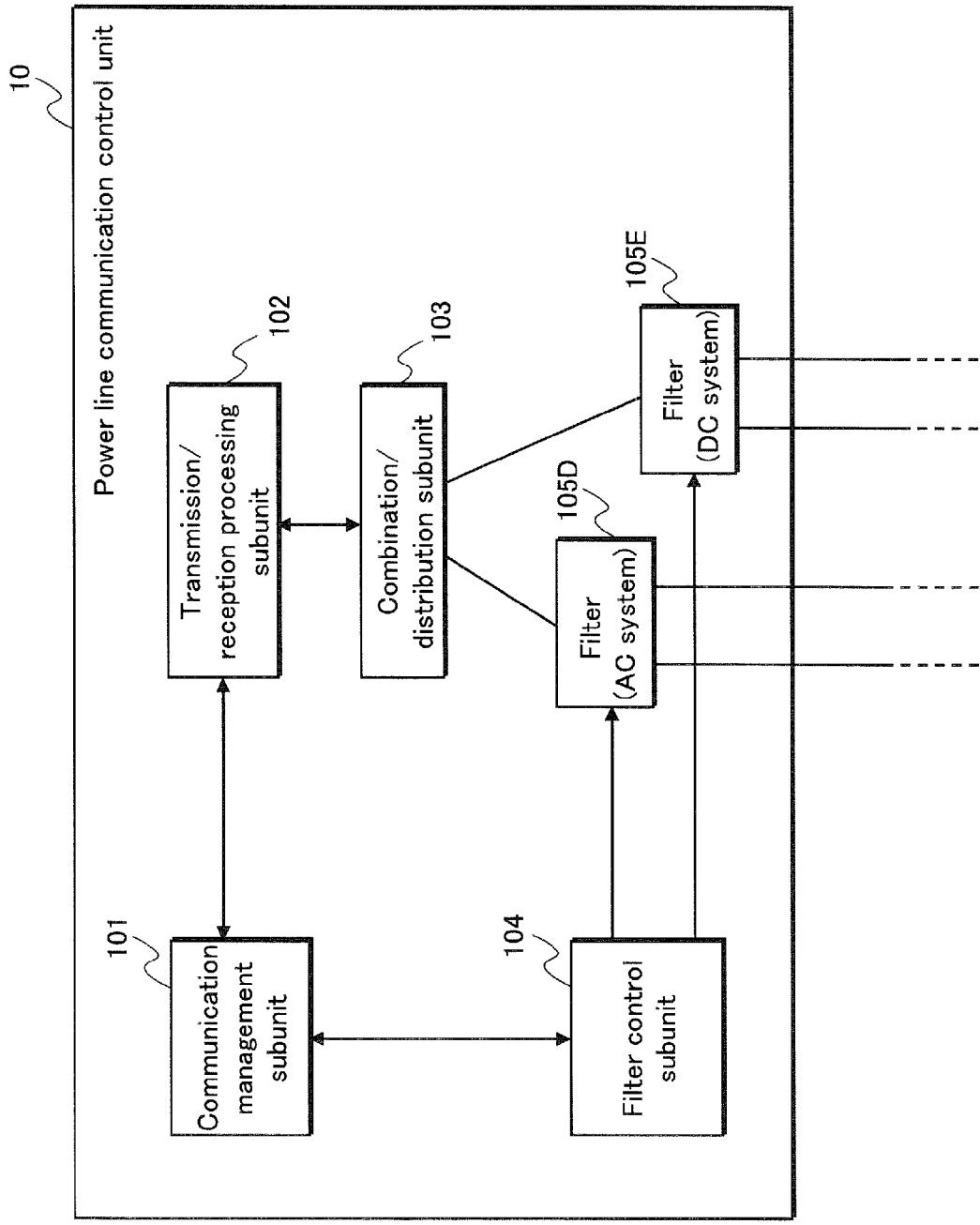
FIG. 10 is a block diagram showing the structure of a power line communication control unit pertaining to Embodiment 3.

FIG. 10 is a functional block diagram showing an example of the functional structure of the power line communication control unit 10 pertaining to the aforementioned case.

The power line communication control unit 10 pertaining to Embodiment 3 is different from the power line communication control unit 10 pertaining to Embodiment 1 as follows. In Embodiment 1, filters are provided in one-to-one correspondence with breakers. In contrast, in Embodiment 3, a filter 105D and a filter 105E are provided for the AC power system and the DC power system, respectively. The separation units 12F and 12G shown in FIG. 9 are connected to the filter 105D. The separation units 12D and 12E shown in FIG. 9 are connected to the filter 105E.

The structure of communication packets transmitted and received by each communication terminal is the same as in Embodiments 1 and 2—i.e., the same as the structure shown in FIGS. 5A to 5D.

The AFE unit 204 in each communication terminal extracts communication signals in accordance with the power system to which the communication terminal belongs. More specifically, a communication terminal belonging to the AC power system separates AC from communication signals and extracts the transmitted packets from the power line channel, whereas a communication terminal belonging to the DC power system separates DC from communication signals and extracts the transmitted packets from the power line channel.

For simplicity, it is assumed herein that all of the communication terminals belonging to the AC power system and the DC power system perform communication using the same band, modulation method and communication protocols.
(Operations)

Figure 11:
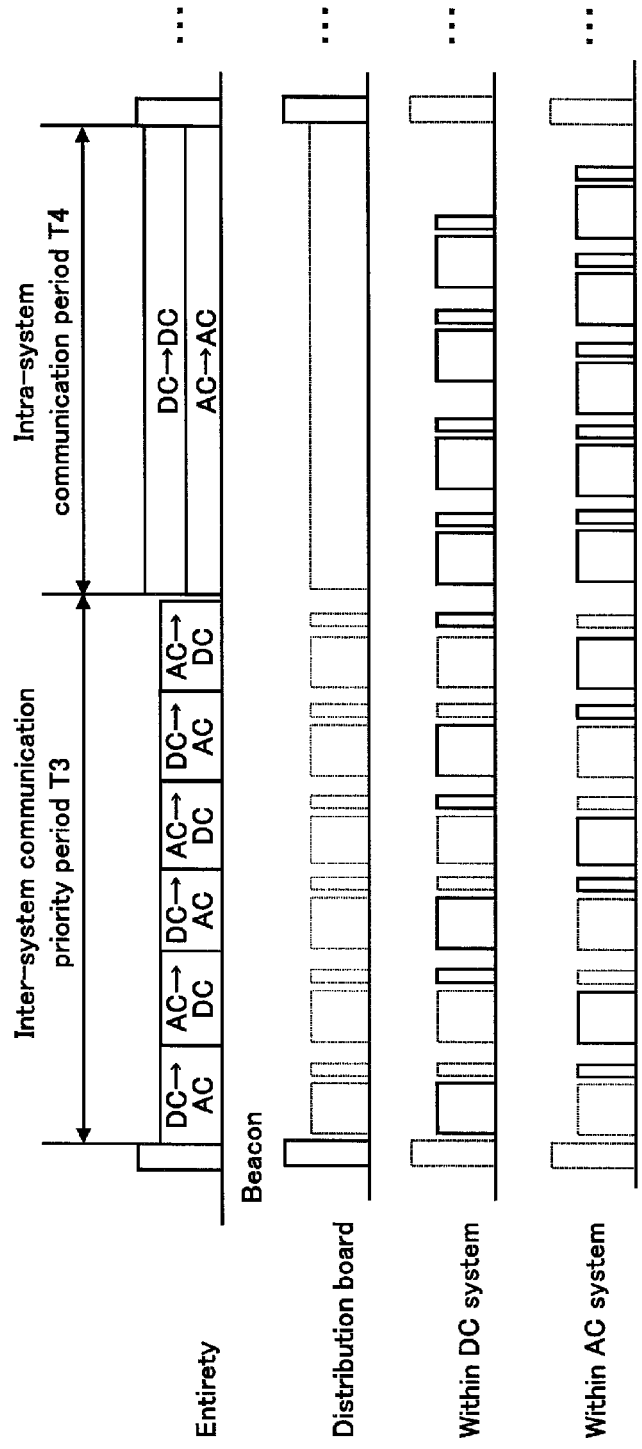
FIG. 11 shows the structure of communication periods in a beacon interval pertaining to Embodiment 3.

FIG. 11 is a timing chart showing the operations of the power line communication system pertaining to the present Embodiment 3.

As apparent from comparison between FIGS. 6 and 11, Embodiment 3 is different from Embodiment 1 in that the inter-breaker communication priority period T1 and the intra-breaker communication period T2 pertaining to Embodiment 1 are replaced with an inter-system communication priority period T3 and an intra-system communication period T4, respectively.
(Additional Notes)

Although the present invention has been described based on the above embodiments, it goes without saying that the present invention is not limited to the above embodiments. The following describes various modification examples that are different from the above embodiments but are included in the concept of the present invention.

(1) In the above Embodiment 1, each communication terminal is notified of a breaker ID by the power line communication control unit 10. However, a method of obtaining a breaker ID is not limited to this. Each communication terminal may obtain a breaker identification number for the system to which it belongs by using other methods. For example, a communication terminal may acknowledge the breaker identification number for the system to which it belongs by (i) receiving a packet transmitted by another transmission terminal belonging to the same system during the intra-breaker communication period T2, and (ii) analyzing the breaker identification number in the header of the received packet.

With the above structure, each communication terminal can adjust the timing of packet transmission in accordance with settings of communication periods notified by the power line communication control unit 10. This can improve the communication efficiency in the power line communication system.

(2) The above Embodiment 1 has explained an example structure in which the inter-breaker communication priority period T1 and the intra-breaker communication period T2 are notified to each communication terminal by transmitting a beacon signal including the period setting information, which indicates one or both of (i) the start time of each of the inter-breaker communication priority period T1 and the intra-breaker communication period T2, and (ii) the end time of each of the inter-breaker communication priority period T1 and the intra-breaker communication period T2. However, a method of determining T1 and T2 is not limited to this. For example, each communication terminal can control communication without being notified of the period setting information by allocating the inter-breaker communication priority period T1 and the intra-breaker communication period T2 within a beacon interval based on predetermined fixed values.

(3) The above Embodiment 1 has described an example structure in which a breaker identification number is included in a communication packet transmitted by each communication terminal. Alternatively, a breaker identification number may not be included in a communication packet transmitted by each communication terminal. For example, each communication terminal may store therein a pre-prepared table showing, for all of the communication terminals in the communication system, correspondence between a communication terminal and a breaker to which that communication terminal belongs. This way, each communication terminal can judge whether or not a partner communication terminal belongs to the same system as itself or a different system from itself, even without including a breaker identification number in a communication packet. Furthermore, by thus eliminating a breaker ID from a communication packet, the data amount of the upper layer data in the communication packet can be increased, and the communication rate can be improved.

(4) The above Embodiment 1 has described an example structure in which the power line communication control unit 10 notifies a breaker identification number to each communication terminal. However, the present invention is not limited to this structure. For example, each breaker may have a transmission/reception processing function to notify its own breaker identification number to each communication terminal connected thereto during the intra-breaker communication period T2.

(5) The above Embodiment 1 has described an example structure in which every breaker system operates in accordance with the same inter-breaker communication priority period T1 and intra-breaker communication period T2. However, every breaker system need not operate in accordance with the same inter-breaker communication priority period T1 and intra-breaker communication period T2. By way of example, it is permissible to set a 13A-13B communication priority period $T1_{AB}$ during which only a communication terminal connected to the system of the branch breaker 13A and a communication terminal connected to the system of the branch breaker 13B can perform communication with each another.

In this case, during the 13A-13B communication priority period $T1_{AB}$, the filter control subunit 104 performs control to place the filters 105A and 105B in a passable state and to place the filter 105C in a blocked state. This way, a communication terminal connected to the system of the branch breaker 13A and a communication terminal connected to the system of the branch breaker 13B can perform inter-breaker communication with each other, and communication terminals connected to the branch breaker 13C can perform intra-breaker communication with one another.

Similarly, it is also permissible to set (i) a 13B-13C communication priority period $T1_{BC}$ during which only a communication terminal connected to the system of the branch breaker 13B and a communication terminal connected to the system of the branch breaker 13C can perform communication with each other, and (ii) a 13A-13C communication time period $T1_{AC}$ during which only a communication terminal connected to the system of the branch breaker 13A and a communication terminal connected to the systems of the branch breaker 13C can communication with each other.

When different inter-breaker communication priority periods T1 are set for different combinations of breaker systems as described above, communication terminals belonging to the same breaker system can perform intra-breaker communication with one another while inter-breaker communication is being performed between terminals belonging to other breaker systems. This can further improve the communication efficiency of the entire system.

(6) The above Embodiment 1 has described an example structure in which a beacon signal is transmitted to every breaker system at a time, and separately from this transmission of the beacon signal, the breaker ID notification packets are transmitted to the breaker systems. However, a method of transmitting a beacon signal is not limited to this. For example, beacon signals may be transmitted one-to-one to the breaker systems, at different timings for different breaker systems. Here, each beacon signal should contain a breaker ID assigned to the corresponding breaker system.

In this case, the power line communication control unit 10 controls the filters 105A to 105C to place only one or more filters corresponding to one or more breaker systems to which beacon signals are transmitted in a passable state, and to place other filters in a blocked state. This way, the power line communication control unit 10 can transmit beacon signals only to the communication terminals connected to the desired breaker systems.

(7) The above Embodiment 1 has described an example structure in which the power line communication control unit 10 is provided in the distribution board 1. Alternatively, the power line communication control unit 10 may be provided outside the distribution board 1.

Here, the power line communication control unit 10 may be placed in a position distant from the distribution board 1. In this case, the filters 105A to 105C should be provided inside the distribution board 1, instead of inside the power line communication control unit 10, and the distribution board 1 controls the filters 105A to 105C based on the period setting information notified from the power line communication control unit 10. At this time, the power line communication control unit 10 may be structured so as to notify the period setting information to the distribution board 1 via power line communication.

The above has also described an example in which the filters 105A to 105C are provided in the distribution board 1 (the power line communication control unit 10) in one-to-one correspondence with the breakers. However, the positions of the filters are not limited to this. For example, one or more filters may be provided on the power lines of a single breaker, so as to group the communication terminals belonging to the system of that breaker into a plurality of networks. In this case, these communication terminals control packet transmission while treating the inter-breaker communication priority period T1 as a period during which communication between communication terminals belonging to different networks is prioritized, and the intra-breaker communication period T2 as a period during which only communication between communication terminals belonging to the same network is performed. Alternatively, communication terminals belonging to a plurality of different breaker systems may be grouped into the same network.

(8) The above Embodiment 1 has described the power line communication system as an example. However, the embodiments of the invention of the present application are not limited to such a power line communication system. The invention of the present application may be similarly applied to any other wired communication methods, as long as control is performed as to whether or not to allow signals to pass through the filters.

(9) In the above Embodiment 1, the period setting information includes the start time and the end time of each of the inter-breaker communication priority period T1 and the intra-breaker communication period T2. However, it suffices if the period setting information can distinguish between the inter-breaker communication priority period T1 and the intra-breaker communication period T2. For example, the period setting information may only include the end time of the inter-breaker communication priority period T1, or may only include the start time of the intra-breaker communication period T2.

(10) In the above Embodiment 1, a beacon signal contains time period setting information. However, a beacon signal need not contain the period setting information when the following conditions are both satisfied: (i) the period setting information has already been notified by using a previous beacon signal; and (ii) no change has been made to the inter-breaker communication priority period T1 and the intra-breaker communication period T2 since transmission of the previous beacon signal.

In this case, when a received beacon signal does not include the inter-breaker communication priority period T1 and the intra-breaker communication period T2, the access control unit 202 in each communication terminal controls communication in accordance with the inter-breaker communication priority period T1 and the intra-breaker communication period T2 that were previously notified.

(11) In the above Embodiment 1, each communication terminal (i) detects, by using the CSMA/CA method, whether or not other communication terminals are performing communication via power lines, and (ii) when other communication terminals are not performing such communication, sands by for a back-off period and then performs communication. These are the operations for avoiding crosstalk between different communication lines. Other methods may be used as long as they do not cause such crosstalk. As one example method of avoiding such crosstalk, the power line communication control unit 10 may specify, in a beacon signal, a time period during which each communication terminal is allowed to transmit signals, the time period being part of the inter-breaker communication priority period T1 or the intra-breaker communication period T2. The TDMA method described in the above Embodiment 1 corresponds to this method.

(12) The above Embodiment 1 has described an example in which the power line communication control unit 10 moves the end time of the inter-breaker communication priority period T1 forward. This substantially means shortening of the inter-breaker communication priority period T1. Consequently, the intra-breaker communication period T2 becomes longer. Accordingly, it suffices if the inter-breaker communication priority period T1 is shortened. A signal indicating the shortening of the inter-breaker communication priority period T1 may be notified by using the period setting information included in the beacon signal for setting the inter-breaker communication priority period T1 and the intra-breaker communication period T2.

(13) The above Embodiment 2 has described an example in which the signal attenuation is suppressed by relaying communication packets. It should be noted here that a procedure for relaying the communication packets is not limited to the one described in the above Embodiment 2. Alternatively, for example, the following procedure may be taken: upon receiving a relay data packet, the power line communication control unit 10 immediately relays the relay data packet; upon receiving the relay data packet, the communication terminal B1 transmits the ACK to the power line communication control unit 10; and the power line communication control unit 10 further relays the ACK to the communication terminal A1.

(14) Although not described in the above Embodiment 2, each communication terminal may select, for each partner communication terminal, whether to perform direct communication or relay communication therewith. Each communication terminal may request relay communication using the above-described procedure in a case where it has failed in direct communication for a predetermined number of times, in a case where it judges that relay communication has better communication efficiency than direct communication after estimating the channels between communication terminals ahead of time, etc.

(15) As shown in FIG. 8, in the power line communication system described in the above Embodiment 2, the following two time periods are set between the time when transmission of a beacon signal is completed and the time when transmission of the next beacon signal is started: (i) the inter-breaker communication priority period T1 during which communication between communication terminals that belong to different breaker systems from one another is prioritized; and (ii) the intra-breaker communication period T2 during which only communication between communication terminals that belong to the same breaker system is performed. It has also been described that each communication terminal performs relay communication during the inter-breaker communication priority period T1.

At this time, if each communication terminal judges that it is more efficient to perform intra-breaker communication via the power line communication control unit 10 in the form of relay communication, each communication terminal may perform such communication during the inter-breaker communication priority period T1. When each communication terminal performs relay communication via another communication terminal belonging to the same breaker system, it may perform the relay communication during the intra-breaker communication period T2.

With the above structure, each communication terminal can adjust the timings for relay communication and direct communication in accordance with the communication period settings notified by the power line communication control unit 10. This way, the relay communication and the intra-breaker communication do not interfere with each other, thus improving the communication efficiency of the power line communication system.

(16) In the above Embodiment 3, the power line communication control unit 10 periodically notifies the terminals belonging to each power system of the identification number for that power system by using the intra-system communication period T4. Each communication terminal transmits a packet whose header contains the identification number for the power system to which it belongs. This way, each communication terminal can judge whether it belongs to the same power system as other communication terminals, or a different power system from other communication terminals.

With the above structure, communication performed in one power system does not interfere with communication performed in other power systems, thus improving the communication efficiency in the entire power line channels.

(17) In the above Embodiment 3, the same communication method is used among different power systems. Alternatively, different communication methods may be used among different power systems. In this case, the power line communication control unit 10 includes a transmission/reception processing subunit compatible with different communication methods used among different power systems, and enables communication between different power systems by bridging different power systems.

Furthermore, the intra-system communication period T4 may be divided into the inter-breaker communication priority period T1 and the intra-breaker communication period T2 so that the inter-breaker communication and the intra-breaker communication can be separately used during the intra-system communication period T4.

(18) In the above Embodiment 3, the DC power system and the AC power system use the same protocols and the like for communication. Alternatively, these two systems may use different communication protocols from each other. In this case, the power line communication control unit 10 may have a so-called bridging function to convert a signal compliant with one communication protocol to a signal compliant with another communication protocol. In this case, the power line communication control unit 10 pertaining to Embodiment 3 preferably includes the relay control subunit 106 described in Embodiment 2, and the relay control subunit 106 preferably has the above-described bridging function.

(19) The structures described in the above Embodiments 1 to 3 and Additional Notes may be combined.

(20) The functional units included in the distribution board 1, the communication terminal A1, and the like (e.g., the power line communication control unit 10, the separation unit 12A, the access control unit 202, and the partner terminal judgment unit 205), as well as the functional units included in the power line communication control unit 10 (e.g., the communication management subunit 101, the transmission/reception processing subunit 102, and the filter control subunit 104), as described in the above embodiments, may each be realized as one or more integrated circuits. Furthermore, a plurality of these functional units may be configures as a single functional unit.

Each integrated circuit may be realized by a semiconductor integrated circuit, which may be referred to as, for example, an integrated circuit (IC), a large-scale integration (LSI), a very-large-scale integration (VLSI), or a super-large-scale integration (SLSI), depending on the degree of integration.

(21) A control program composed of the following may be recorded on a recording medium or distributed/disseminated via various types of channels: operations associated with the communication described in the above Embodiments; and program codes for causing processors of the distribution board, etc., and various types of circuits connected to those processors, to perform the ON/OFF processing for the filters and the like. Examples of such a recording medium include an IC card, a hard disk, an optical disc, a flexible disk, and a ROM. The distributed/disseminated control program is put in a usable state by being stored in memory or the like that can be read by the processors. Various functions described in Embodiments can be realized by the processors executing the control program.

INDUSTRIAL APPLICABILITY

A control device pertaining to the present invention can be used as a control device capable of supplying power and alleviating the signal attenuation during power line communication, and also as a distribution board capable of supplying power to home electronic appliances.

REFERENCE SIGNS LIST

1 distribution board
10 power line communication control unit 11, 11A, 11B main breaker
12A to 12G separation unit
13A to 13G branch breaker
101 communication management subunit
102 transmission/reception processing subunit
103 combination/distribution subunit
104 filter control subunit
105A-105E filter
106 relay control subunit
201 upper layer I/F unit
202 access control unit
203 modulation/demodulation unit
204 AFE unit
205 partner terminal judgment unit

The invention claimed is:

1. A control device included in a communication system in which a plurality of networks are connected to one another by one or more wired channels, the control device comprising:
a communication management unit configured to determine, for each network, (i) an inter-network communication period during which a communication terminal belonging to the network is allowed to perform communication with another communication terminal belonging to another network, and (ii) an intra-network communication period during which a communication terminal belonging to the network is allowed to perform communication only with another communication terminal belonging to the network; and
a control unit configured to place, among one or more filters provided between the networks, (i) any filter provided between at least two of the networks in a passable state during the inter-network communication period, and (ii) every filter in a blocked state during the intra-network communication period, wherein
power line communication is performed in the communication system,
the control device is connected to the networks by the one or more wired channels via a plurality of breakers provided in one-to-one correspondence with the networks,
the control device further comprises the filters, which are provided in one-to-one correspondence with the networks, and
the filters are connected in one-to-one correspondence to the breakers.

2. A control device included in a communication system in which a plurality of networks are connected to one another by one or more wired channels, the control device comprising:
a communication management unit configured to determine, for each network, (i) an inter-network communication period during which a communication terminal belonging to the network is allowed to perform communication with another communication terminal belonging to another network, and (ii) an intra-network communication period during which a communication terminal belonging to the network is allowed to perform communication only with another communication terminal belonging to the network;
a control unit configured to place, among one or more filters provided between the networks, (i) any filter provided between at least two of the networks in a passable state during the inter-network communication period, and (ii) every filter in a blocked state during the intra-network communication period; and
a transmission/reception unit configured to transmit and receive a signal to and from communication terminals that each belong to one of the networks, wherein
the transmission/reception unit transmits, to each communication terminal, a network notification signal containing network identification information for identifying one of the networks to which the communication terminal belongs.

3. The control device of claim 2, wherein
when the network notification signal is transmitted, the control unit places (i) one of the filters that corresponds to one of the networks in the passable state, and (ii) the rest of the filters that corresponds to the rest of the networks in the blocked state, and
the transmission/reception unit transmits the network notification signal by broadcast.

4. The control device of claim 2, wherein
the transmission/reception unit transmits, to each communication terminal, a communication period signal that specifies the inter-network communication period and the intra-network communication period determined for one of the networks to which the communication terminal belongs.

5. The control device of claim 4, wherein
the transmission/reception unit judges whether inter-network communication has not been performed for a predetermined period during the inter-network communication period, the inter-network communication being communication between communication terminals that belong to different networks from each other, and
when the transmission/reception unit judges that the inter-network communication has not been performed for the predetermined period during the inter-network communication period, the communication management unit shortens the inter-network communication period.

6. The control device of claim 5, wherein
the transmission/reception unit transmits the communication period signal in succession.

7. The control device of claim 2, further comprising
a relay control unit configured to relay a communication packet transmitted to and received by communication terminals that belong to different networks from each other.

8. The control device of claim 7, wherein
at least one of the networks uses a communication protocol different from a communication protocol used by the rest of the networks, and
the relay control unit bridges the different communication protocols.

9. The control device of claim 2, wherein
during the inter-network communication period, the control unit places only one or more of the filters provided on a part of the one or more wired channels connecting between a first network and a second network in the passable state, the first and second networks being included in the networks.

10. A communication terminal belonging to one of a plurality of networks that are connected to one another by one or more wired channels, the networks and a control device being included in a communication system, the communication terminal comprising:
a transmission/reception unit configured to transmit and receive a signal to and from the control device and other communication devices; and
an access control unit configured to perform control so that (i) the communication terminal performs communication with another communication terminal belonging to another one of the networks during an inter-network communication period where a filter provided between said one of the networks to which the communication terminal belongs and said another one of the networks to which said another communication terminal belongs is placed in a passable state by the control device, and (ii) the communication terminal performs communication with another communication terminal belonging to said one of the networks to which the communication terminal belongs during an intra-network communication period where any filter provided between said one of the networks to which the communication terminal belongs and the rest of the networks is placed in a blocked state by the control device, wherein the transmission/reception unit (i) receives, from the control device, a signal containing network identification information which indicates a network identification number allocated to said one of the networks to which the communication terminal belongs, and (ii) when performing communication with another communication terminal, transmits a packet containing the network identification number allocated to said one of the networks to which the communication terminal belongs.

11. The communication terminal of claim 10, wherein
the transmission/reception unit receives, from another communication terminal, a packet containing a network identification number allocated to one of the networks to which said another communication terminal belongs, and the communication terminal further comprises a partner terminal judgment unit configured to (i) when the network identification number contained in the packet received from said another communication terminal matches the network identification number allocated to said one of the networks to which the communication terminal belongs, judge that said another communication terminal and the communication terminal belong to the same network, and (ii) when the network identification number contained in the packet received from said another communication terminal does not match the network identification number allocated to said one of the networks to which the communication terminal belongs, judge that said another communication terminal and the communication terminal belong to different networks from each other.

12. The communication terminal of claim 11, wherein
the transmission/reception unit receives, from the control device, a signal containing period setting information indicating the inter-network communication period and the intra-network communication period, and the access control unit controls communication in accordance with the period setting information.

13. The communication terminal of claim 12, wherein
intra-network communication is allowed to be performed during the inter-network communication period, and the access control unit performs control so that inter-network communication is prioritized over the intra-network communication during the inter-network communication period.

14. A filter control method performed by a control device included in a communication system in which a plurality of networks are connected to one another by one or more wired channels, the filter control method comprising the steps of:

determining, for each network, (i) an inter-network communication period during which a communication terminal belonging to the network is allowed to perform communication with another communication terminal belonging to another one of the networks, and (ii) an intra-network communication period during which a communication terminal belonging to the network is allowed to perform communication only with another communication terminal belonging to the network;

placing, among one or more filters provided between the networks, (i) any filter provided between at least two of the networks in a passable state during the inter-network communication period, and (ii) every filter in a blocked state during the intra-network communication period; and transmitting and receiving a signal to and from communication terminals that each belong to one of the networks, and transmitting, to each communication terminal, a network notification signal containing network identification information for identifying one of the networks to which the communication terminal belongs.

15. A communication control method performed by a communication terminal belonging to one of a plurality of networks that are connected to one another by one or more wired channels, the networks and a control device being included in a communication system, the communication control method comprising the steps of:

transmitting and receiving a signal to and from the control device and other communication devices; and performing control so that (i) the communication terminal performs communication with another communication terminal belonging to another one of the networks during an inter-network communication period where a filter provided between said one of the networks to which the communication terminal belongs and said another one of the networks to which said another communication terminal belongs is placed in a passable state by the control device, and (ii) the communication terminal performs communication with another communication terminal belonging to said one of the networks to which the communication terminal belongs during an intra-network communication period where any filter provided between said one of the networks to which the communication terminal belongs and the rest of the networks is placed in a blocked state by the control device, wherein the communication terminal (i) receives, from the control device, a signal containing network identification information which indicates a network identification number allocated to said one of the networks to which the communication terminal belongs, and (ii) when performing communication with another communication terminal, transmits a packet containing the network identification number allocated to said one of the networks to which the communication terminal belongs.

16. An integrated circuit provided in a control device included in a communication system in which a plurality of networks are connected to one another by one or more wired channels, the integrated circuit comprising:

a communication management unit configured to determine, for each network, (i) an inter-network communication period during which a communication terminal belonging to the network is allowed to perform communication with another communication terminal belonging to another network, and (ii) an intra-network communication period during which a communication terminal belonging to the network is allowed to perform communication only with another communication terminal belonging to the network;

a control unit configured to place, among one or more filters provided between the networks, (i) any filter provided between at least two of the networks in a passable state during the inter-network communication period, and (ii) every filter in a blocked state during the intra-network communication period; and a transmission/reception unit configured to transmit and receive a signal to and from communication terminals that each belong to one of the networks, wherein the transmission/reception unit transmits, to each communication terminal, a network notification signal containing network identification information for identifying one of the networks to which the communication terminal belongs.

* * * * *